United States Patent
Yang et al.

(10) Patent No.: US 9,872,301 B2
(45) Date of Patent: Jan. 16, 2018

(54) METHOD FOR RECEIVING SIGNAL WITH INTERFERENCE ELIMINATED AND TERMINAL THEREFOR

(71) Applicant: LG ELECTRONICS INC., Seoul (KR)

(72) Inventors: Yoonoh Yang, Seoul (KR); Sangwook Lee, Seoul (KR); Manyoung Jung, Seoul (KR); Suhwan Lim, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 184 days.

(21) Appl. No.: 14/760,422

(22) PCT Filed: Jan. 29, 2014

(86) PCT No.: PCT/KR2014/000830
§ 371 (c)(1),
(2) Date: Jul. 10, 2015

(87) PCT Pub. No.: WO2014/119918
PCT Pub. Date: Aug. 7, 2014

(65) Prior Publication Data
US 2015/0358975 A1    Dec. 10, 2015

Related U.S. Application Data

(60) Provisional application No. 61/759,415, filed on Feb. 1, 2013.

(51) Int. Cl.
*H04W 72/08* (2009.01)
*H04B 1/10* (2006.01)
(Continued)

(52) U.S. Cl.
CPC ............ *H04W 72/082* (2013.01); *H04B 1/10* (2013.01); *H04B 15/00* (2013.01); *H04J 11/005* (2013.01);
(Continued)

(58) Field of Classification Search
CPC ... H04W 72/082; H04W 48/12; H04W 28/12; H04W 36/0088; H04W 52/244;
(Continued)

(56) References Cited

U.S. PATENT DOCUMENTS 8,457,079 B2 *   6/2013   Krishnamurthy . H04W 56/0045
                                                        370/336
9,198,181 B2 *   11/2015   Blankenship ....... H04W 72/042
(Continued)

FOREIGN PATENT DOCUMENTS

KR   10-2012-0052654 A   5/2012
WO   WO 2011/130450 A1   10/2011

OTHER PUBLICATIONS

Renesas Mobile Europe Ltd., "On PBCH interference cancellation for felCIC", 3GPP TSG-RAN WG4 Meeting #63 UE performance AH, R4-63AH-0010, Jun. 26-28, 2012.

*Primary Examiner* — Brian O'Connor
(74) *Attorney, Agent, or Firm* — Birch, Stewart, Kolasch & Birch, LLP

(57) ABSTRACT

An embodiment of the present invention provides a method for receiving a signal with an interference eliminated. The method for receiving a signal with an interference eliminated includes the steps of: receiving the information of PBCH (Physical Broadcast Channel) of a neighbor interference cell from a serving cell; receiving the information of the downlink synchronization with the neighbor interference cell from the serving cell; identifying the channel of the serving cell suffering an interference by PBCH of the
(Continued)

neighbor interference cell based on the information of the downlink synchronization; and eliminating the interference for receiving the identified channel based on the information of PBCH of the neighbor interference cell.

13 Claims, 22 Drawing Sheets

(51) Int. Cl.

| | | |
|---|---|---|
| *H04W 72/00* | (2009.01) | |
| *H04B 15/00* | (2006.01) | |
| *H04W 72/04* | (2009.01) | |
| *H04W 56/00* | (2009.01) | |
| *H04L 5/00* | (2006.01) | |
| *H04J 11/00* | (2006.01) | |
| *H04W 36/00* | (2009.01) | |
| *H04W 28/12* | (2009.01) | |
| *H04W 52/24* | (2009.01) | |
| *H04W 48/12* | (2009.01) | |
| *H04B 7/0413* | (2017.01) | |

(52) U.S. Cl.
CPC .......... *H04L 5/0073* (2013.01); *H04L 5/0092* (2013.01); *H04W 56/00* (2013.01); *H04W 72/005* (2013.01); *H04W 72/0446* (2013.01); *H04B 7/0413* (2013.01); *H04L 5/0053* (2013.01); *H04W 28/12* (2013.01); *H04W 36/0088* (2013.01); *H04W 48/12* (2013.01); *H04W 52/244* (2013.01)

(58) Field of Classification Search
CPC ............... H04W 56/00; H04W 72/005; H04W 72/0446; H04J 11/005; H04L 5/0053; H04L 5/0092; H04L 5/0073; H04B 7/0413; H04B 1/10; H04B 15/00
See application file for complete search history.

(56) References Cited

U.S. PATENT DOCUMENTS

| | | | |
|---|---|---|---|
| 9,253,651 B2* | 2/2016 | Palanki | H04B 1/7107 |
| 2011/0235562 A1 | 9/2011 | Tong et al. | |
| 2011/0261782 A1 | 10/2011 | Nakano et al. | |
| 2012/0122502 A1 | 5/2012 | Shin et al. | |
| 2013/0188558 A1* | 7/2013 | Nam | H04W 24/02 370/328 |
| 2014/0126403 A1* | 5/2014 | Siomina | H04W 24/10 370/252 |
| 2015/0049649 A1* | 2/2015 | Zhu | H04L 5/0092 370/277 |
| 2015/0195057 A1* | 7/2015 | Tan | H04J 11/005 370/252 |
| 2015/0296526 A1* | 10/2015 | Behravan | H04W 16/14 370/329 |
| 2016/0021554 A1* | 1/2016 | Behravan | H04W 24/02 455/63.1 |
| 2016/0233972 A1* | 8/2016 | Dinan | H04W 16/32 |
| 2017/0012691 A1* | 1/2017 | Lee | H04L 25/0226 |

* cited by examiner

METHOD FOR RECEIVING SIGNAL WITH INTERFERENCE ELIMINATED AND TERMINAL THEREFOR

CROSS REFERENCE TO RELATED APPLICATIONS

This application is the National Phase of PCT International Application No. PCT/KR2014/000830, filed on Jan. 29, 2014, which claims priority under 35 U.S.C. 119(e) to U.S. Provisional Application No. 61/759,415, filed on Feb. 1, 2013, all of which are hereby expressly incorporated by reference into the present application.

BACKGROUND OF THE INVENTION

Field of the Invention

The present disclosure relates to a method for receiving a signal with interference cancellation, and a terminal therefor.

Related Art

A 3rd generation partnership project (3GPP) long term evolution (LTE) that improves a universal mobile telecommunications system (UMTS) has been introduced to a 3GPP release 8. The 3GPP LTE uses an orthogonal frequency division multiple access (OFDMA) in a downlink and a single carrier-frequency division multiple access (SC-FDMA) in an uplink. The OFDM needs to know in order to understand the OFDMA. The OFDM may be used since an inter-symbol interference effect can be reduced due to low complexity. The OFDM converts data to be input in serial into N parallel data and transmits it by carrying N orthogonal sub-carriers. The sub-carriers maintains orthogonally in a frequency dimension. Meanwhile, the OFDMA means a multiple access method to realize multiple accesses by providing a part of the available sub-carrier to each user independently, in a system using the OFDM in a modulation scheme.

In recent years, there is an ongoing discussion on 3GPP LTE-advanced (LTE-A) evolved from the 3GPP LTE.

Also, recently, a heterogeneous network in which a macro cell and a small cell coexist are under discussion. In particular, discussions for bypassing traffic by distributing a terminal connected to a macro cell to a small well are in progress.

Meanwhile, interference may further increase due to such a small cell, and thus, interference removal capability (or an interference cancellation capability) is urgently required.

SUMMARY OF THE INVENTION

The present invention has been made to solve the above-mentioned problems.

In detail, an embodiment of the present disclosure provides a method for effectively canceling interference, and a terminal.

To achieve the above objects, the present disclosure provides a method for receiving signal using an interference cancellation. The method may comprise: receiving information regarding a PBCH (Physical Broadcast Channel) of a neighbor interference cell from a serving cell; receiving information regarding downlink synchronization with the neighbor interference cell from the serving cell; identifying a channel of the serving cell suffering an interference by the PBCH of the neighbor interference cell according to the downlink synchronization information; and canceling the interference for receiving the identified channel using the information regarding the PBCH of the neighbor interference cell.

The downlink synchronization information may include downlink timing offset information between the serving cell and the neighbor interference cell. Here, the timing offset information may be expressed by the number of slots and the number of subframes.

When the timing offset is 0, the channel of the serving cell suffering interference by the PBCH of the neighbor interference cell may be identified as a PBCH.

When the timing offset is a subframe unit or 1 to 6 symbols or 11 to 13 symbols, the channel of the serving cell suffering interference by the PBCH of the neighbor interference cell may be identified as a PDSCH (Physical Downlink Shared Channel).

When the timing offset is 7 or 8 symbols, the channel of the serving cell suffering interference by the PBCH of the neighbor interference cell may be identified as one of a PDCCH (Physical Downlink Control Channel), a PCFICH (Physical Control Format Indicator Channel), and a PHICH (Physical Hybrid-ARQ Indicator Channel).

When the timing offset is 9 or 10 symbols, the channel of the serving cell suffering interference by the PBCH of the neighbor interference cell may be identified as one of a PDSCH, a PDCCH, a PCFICH, and a PHICH.

The performing of interference cancelation may comprise: regenerating a PBCH of the neighbor interference cell by using the information regarding the PBCH of the neighbor interference cell; and performing interference cancelation by canceling a signal based on the regenerated PBCH from a channel signal of the serving cell including interference by the PBCH of the neighbor cell.

The regenerating step may comprise: encoding the PBCH of the neighbor interference cell on the basis of the information regarding the PBCH of the neighbor interference cell.

In the regenerating, a PBCH of the neighbor interference cell may be regenerated using the encoded PBCH and a channel estimation result.

To achieve the above objects, the present disclosure provides a terminal for receiving a signal using an interference cancellation. The terminal may comprise: a reception unit configured to receive information regarding a PBCH (Physical Broadcast Channel) of a neighbor interference cell and information regarding downlink synchronization with the neighbor interference cell; and an interference cancellation unit configured to identify a channel of a serving cell suffering an interference by the PBCH of the neighbor interference cell according to the downlink synchronization information, and cancel an interference to receive the identified channel by using the information regarding the PBCH of the neighbor interference cell.

According to an embodiment of the present disclosure, interference by a PBCH of a neighbor cell may be relatively simply canceled by using interference cancelation support information of the neighbor cell transmitted from a serving cell, without increasing complexity of a terminal. Thus, reception capability of a signal from the serving cell may be enhanced.

DESCRIPTION OF EXEMPLARY EMBODIMENTS

Figure 1:
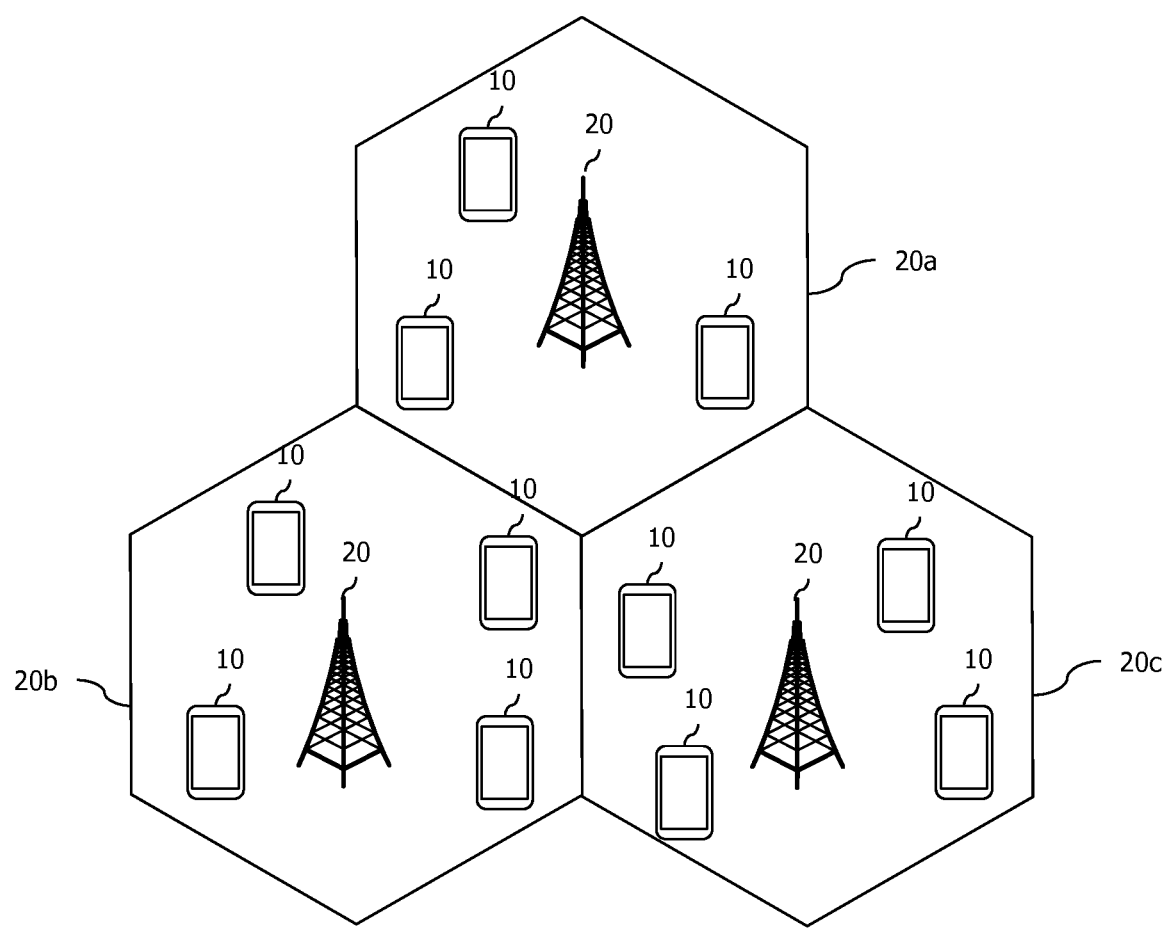
FIG. 1 illustrates a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

Hereinafter, applications of the present invention based on 3GPP (3rd generation partnership project) LTE (long term evolution) or 3GPP LTE-A (advanced) are described. However, this is merely an example, and the present invention may apply to various wireless communication systems. Hereinafter, LTE includes LTE and/or LTE-A.

FIG. 1 shows a wireless communication system.

The wireless communication system 10 includes at least one base station (BS) 20. Respective BSs 20 provide a communication service to particular geographical areas 20a, 20b, and 20c (which are generally called cells). Each cell may be divided into a plurality of areas (which are called sectors). A user equipment (UE) 10 may be fixed or mobile and may be referred to by other names such as mobile station (MS), mobile user equipment (MT), user equipment (UT), subscriber station (SS), wireless device, personal digital assistant (PDA), wireless modem, handheld device. The BS 201 generally refers to a fixed station that communicates with the UE 10 and may be called by other names such as evolved-NodeB (eNB), base transceiver system (BTS), access point (AP), etc.

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Figure 2:
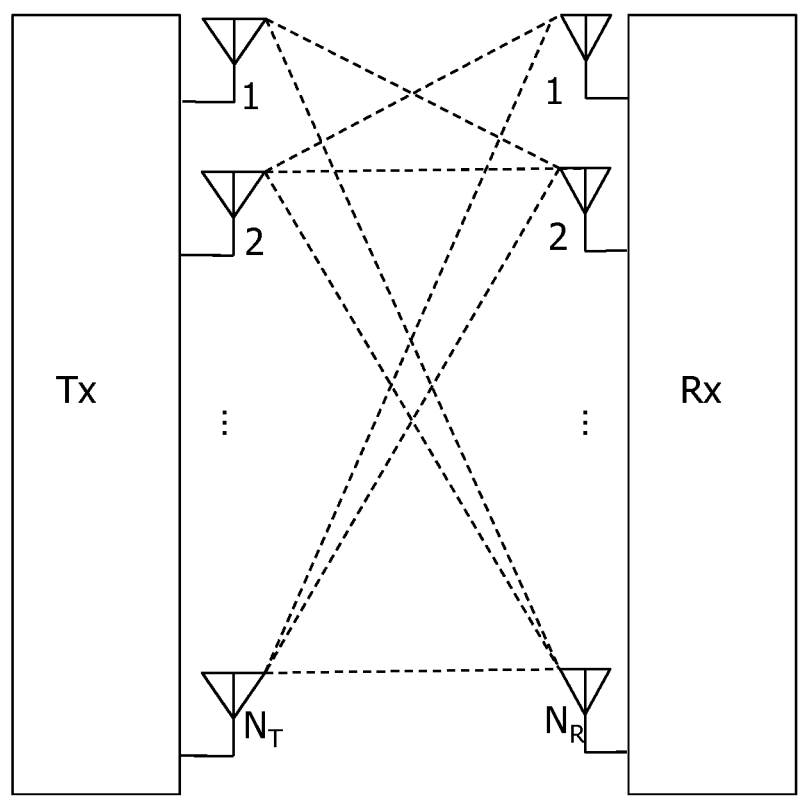
FIG. 2 is a view illustrating an antenna configuration of a multi-antenna system.

FIG. 2 illustrates a general multiple antenna system.

As shown in FIG. 2, when increasing the number of transmission antenna to $N_T$ and increasing the number of reception antenna to $N_R$ at the same time, a transmission rate can be increased and a frequency efficiency can be dramatically increased because a theoretical channel transmission capacity is increased in proportion to the number of antenna, unlike the case of using multiple antennas only in either one of transmitter or receiver.

The transmission rate due to the increase of channel transmission capacity may be theoretically increased by multiple of a maximum transmission rate $R_0$ in case of using an antenna and a rate increase $R_i$ as shown below.

$$R_i = \min(N_T, N_R) \quad \text{[Equation 1]}$$

Transmission information may include a maximum of $N_T$ number of different information items when the number of transmit antennas is $N_T$.

$$S = [S_1, S_2, \ldots, S_{N_T}]^T \quad \text{[Equation 2]}$$

In Equation 2, s denotes transmission information vector, and $s_1, s_2, \ldots, s_{NT}$ denotes information items as elements of the transmission information vector. Each of the information items may be transmitted with different transmission power. When each transmission power is denoted as ($P_1, P_2, \ldots, P_{NT}$), the transmission information vector to which transmission power is applied may be expressed as Equation 3 below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Equation 3 may be expressed as the product of a transmission power diagonal matrix and the transmission information vector, as expressed by Equation 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

A weight matrix is multiplied to the transmission information vector with transmission power applied thereto to generate transmission signals ($x_1, x_2, \ldots, x_{NT}$) transmitted through the actual $N_T$ number of transmission antennas. The weight matrix W serves to appropriately distribute transmission information to individual antennas according to a transmission channel situation. When a transmission signal vector is x, x may be expressed as Equation 5 below.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & & w_{iN_T} \\ \vdots & & & \ddots & \\ w_{N_T 1} & w_{N_T 2} & \ldots & w_{N_T N_T} \end{bmatrix} \begin{bmatrix} \hat{s}_1 \\ \hat{s}_{21} \\ \vdots \\ \hat{s}_j \\ \vdots \\ \hat{s}_{N_T} \end{bmatrix} = W\hat{s} = WPs \quad \text{[Equation 5]}$$

In Equation 5, an element $w_{ij}(1 \leq i \leq N_T, 1 \leq j \leq N_T)$ of the weight matrix denotes a weight value for ith transmission antenna and jth transmission information. The weight matrix W is also called a precoding matrix.

The transmission signal vector may include different transmission information according to a transmission technique. For example, when space diversity, i.e., transmission diversity, is applied, all of transmission information of transmission signal vectors may be the same. That is, [$s_1, s_2, \ldots, s_{nT}$] may be the same information, for example, [$s_1, s_1, \ldots, s_1$]. Thus, since the same transmission information is transmitted to a received through different channels, a diversity effect is obtained and reliability of transmission increases.

Or, when space multiplexing is applied, all of transmission information of transmission signal vectors may be different. That is, $s_1, s_2, \ldots, s_{nT}$ may be different information. Since different transmission information is transmitted to a receiver through different channels, an amount of transmittable information may increase.

Also, transmission information may be transmitted using both space diversity and space multiplexing. That is, in the foregoing example, the same information may be transmitted through three transmission antennas by space diversity, while different information may be transmitted through the other remaining transmission antennas by space multiplexing. In this case, the transmission information vector may be configured as [$s_1, s_1, s_1, s_2, s_3 \ldots, s_{nT-2}$], for example.

When a receiver has $N_R$ number of reception antennas, signals received by the individual reception antennas may be expressed as $y_n(1 \leq n \leq N_R)$. Here, the reception signal vector y may be expressed as Equation 6 below.

$$y = [y_1, y_2, \ldots, y_{N_R}]^T \quad \text{[Equation 6]}$$

When channel remodeling is performed in a MIMO system, channels may be discriminated by an index of a transmission antenna and an index of a reception antenna. When the index of the transmission antenna is j and the index of the reception antenna is I, a channel between the transmission antenna and the reception antenna may be expressed as $h_{ij}$ (An attention should be paid to the fact that the index of the reception antenna is first expressed and the index of the transmission antenna is expressed later in the subscript expressing the channel).

Figure 3:
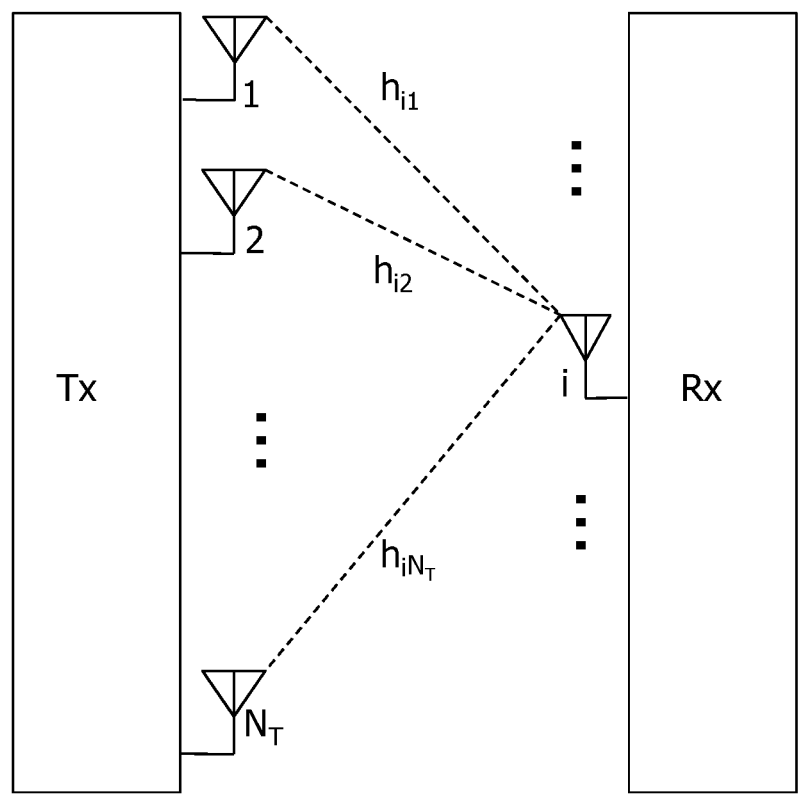
FIG. 3 is a view illustrating an example of a channel in the multi-antenna system.

FIG. 3 is a view illustrating a channel in a multi-antenna system.

Referring to FIG. 3, channels with respect to $N_T$ number of transmission antennas and a reception antenna I are expressed as $h_{i1}, h_{i2}, \ldots, h_{iN_T}$, respectively. For the sake of convenience, these channels may be expressed as a matrix or a vector. The channels may be expressed in the form of vector in Equation 7 below.

$$h_i^T = [h_{i1}, h_{i2}, \ldots, h_{iN_T}] \quad \text{[Equation 7]}$$

When a matrix form of all the channels from $N_T$ number of transmission antennas to $N_R$ number of reception antennas is a channel matrix H, the channel matrix H may be expressed as Equation 8 below.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

Signals transmitted through the transmission antennas may be received by the reception antennas through the channels expressed in Equation 8. Here, noise is added in the actual channels. Such noise may be considered as additive white Gaussian noise (AWGN) mathematically. When AWGN added to the reception antennas is expressed as $n_1, n_2, \ldots, n_{NR}$, the AWGN may be expressed as a vector of Equation 9 below for the sake of convenience.

$$n = [n_1, n_2, \ldots, n_{N_R}]^T \quad \text{[Equation 9]}$$

In consideration of the foregoing AWGN, the transmission signal vector x, and the channel matrix, a reception signal vector y received by the reception antennas may be expressed as Equation 10 below.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

In the channel matrix H, the number of rows and the number of columns are determined depending on the number of transmission antennas and the number of reception antennas. In the channel matrix H, the number of columns is equal to the number of transmission antennas. Thus, the channel matrix H may be expressed as a $N_R \times N_T$ matrix.

In general, a rank of a matrix is defined by a smaller one among the number of independent rows and the number of independent columns. Thus, the rank of the matrix cannot be greater than the number of columns or the number of rows, and the rank of the channel matrix H may be determined as Equation 11 below.

$$\text{rank}(H) \leq \min(N_T, N_R) \quad \text{[Equation 11]}$$

Meanwhile, a wireless communication system may be divided into a frequency division duplex (FDD) method and a time division duplex (TDD) method. Based on the FDD method, an uplink transmission and a downlink transmission are progressed in different frequency bands. Based on the TDD method, the uplink transmission and the downlink transmission are performed in the same frequency band at different times. A channel response of a TDD method is actually reciprocal. This means the downlink channel response and the uplink channel response are almost same in the current frequency domain. Therefore, there is an advantage in that the downlink channel response in the wireless communication system based on the TDD may be obtained from the uplink channel response. In the TDD method, as the whole frequency domain is divided into an uplink transmission and a downlink transmission by time-share, it is not available to perform the downlink transmission by a terminal and the uplink transmission by a UE at the same time. In the TDD system in which an uplink transmission and a downlink transmission are divided by a subframe unit, the uplink transmission and the downlink transmission are performed in different subframes.

Hereinafter, the LTE system is described in further detail.

Figure 4:
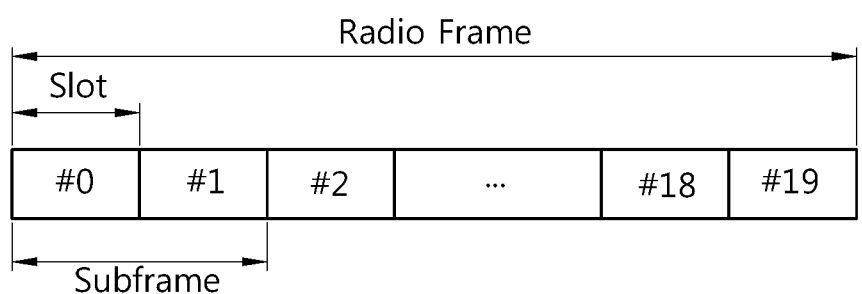
FIG. 4 is a view illustrating a structure of a radio frame according to FDD in a 3GPP LTE.

FIG. 4 illustrates the architecture of a radio frame according to FDD in 3GPP LTE.

Referring to FIG. 4, the radio frame is composed of ten subframes, and one subframe is composed of two slots. The slots in the radio frame are designated by slot numbers from 0 to 19. The time at which one subframe is transmitted is referred to as a transmission time interval (TTI). The TTI may be called as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame, the number of slots included in the subframe, etc. may be variously modified.

Figure 5:
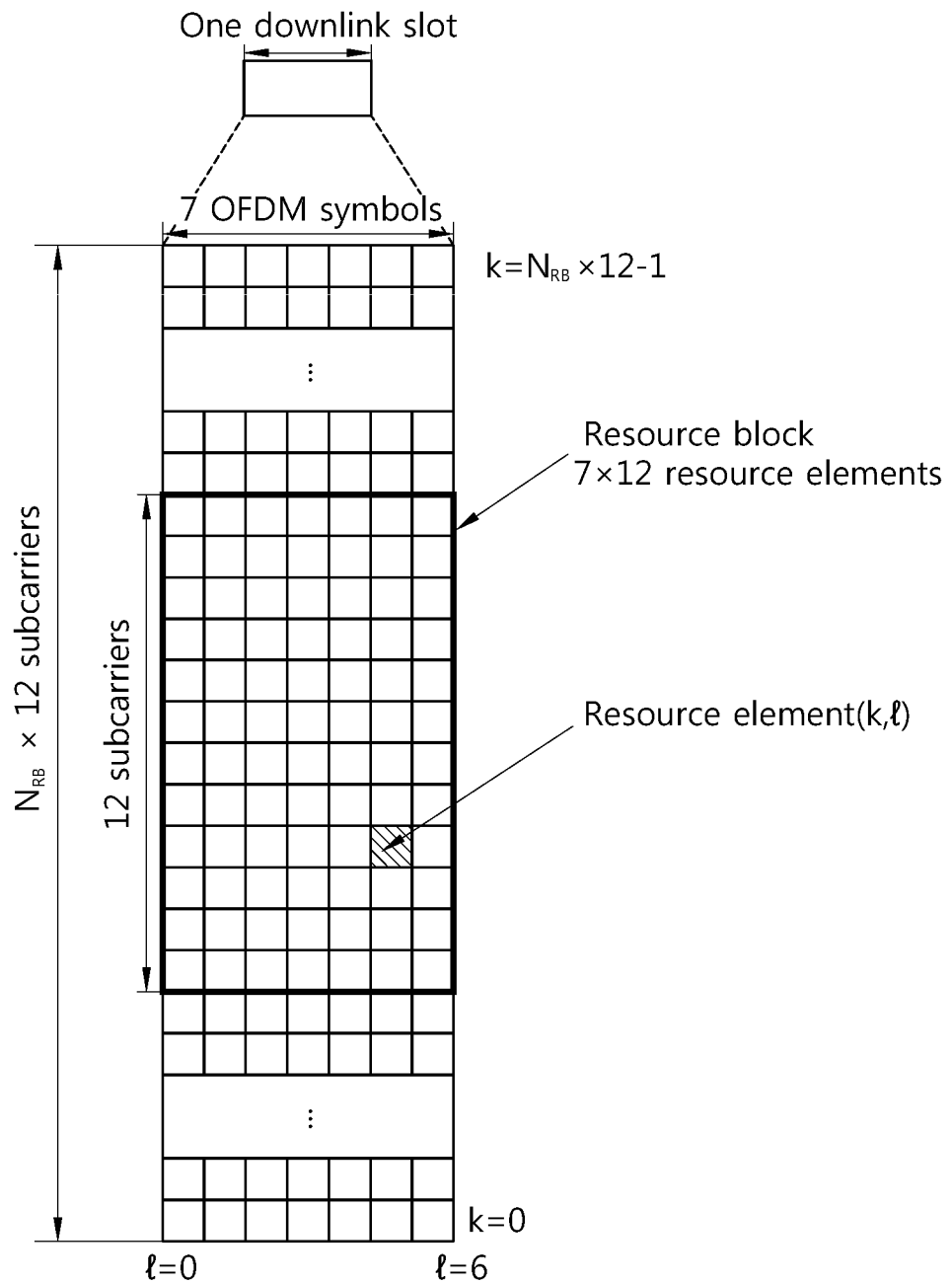
FIG. 5 is a view illustrating a resource grid regarding a single uplink or downlink slot in the 3GPP LTE.

FIG. 5 illustrates an example resource grid for one uplink or downlink slot in 3GPP LTE.

Referring to FIG. 5, the uplink slot includes a plurality of OFDM (orthogonal frequency division multiplexing) symbols in the time domain and NUL resource blocks (RBs) in the frequency domain. OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

In 3GPP LTE, the resource grid for one uplink slot shown in FIG. 4 may also apply to the resource grid for the downlink slot.

Figure 6:
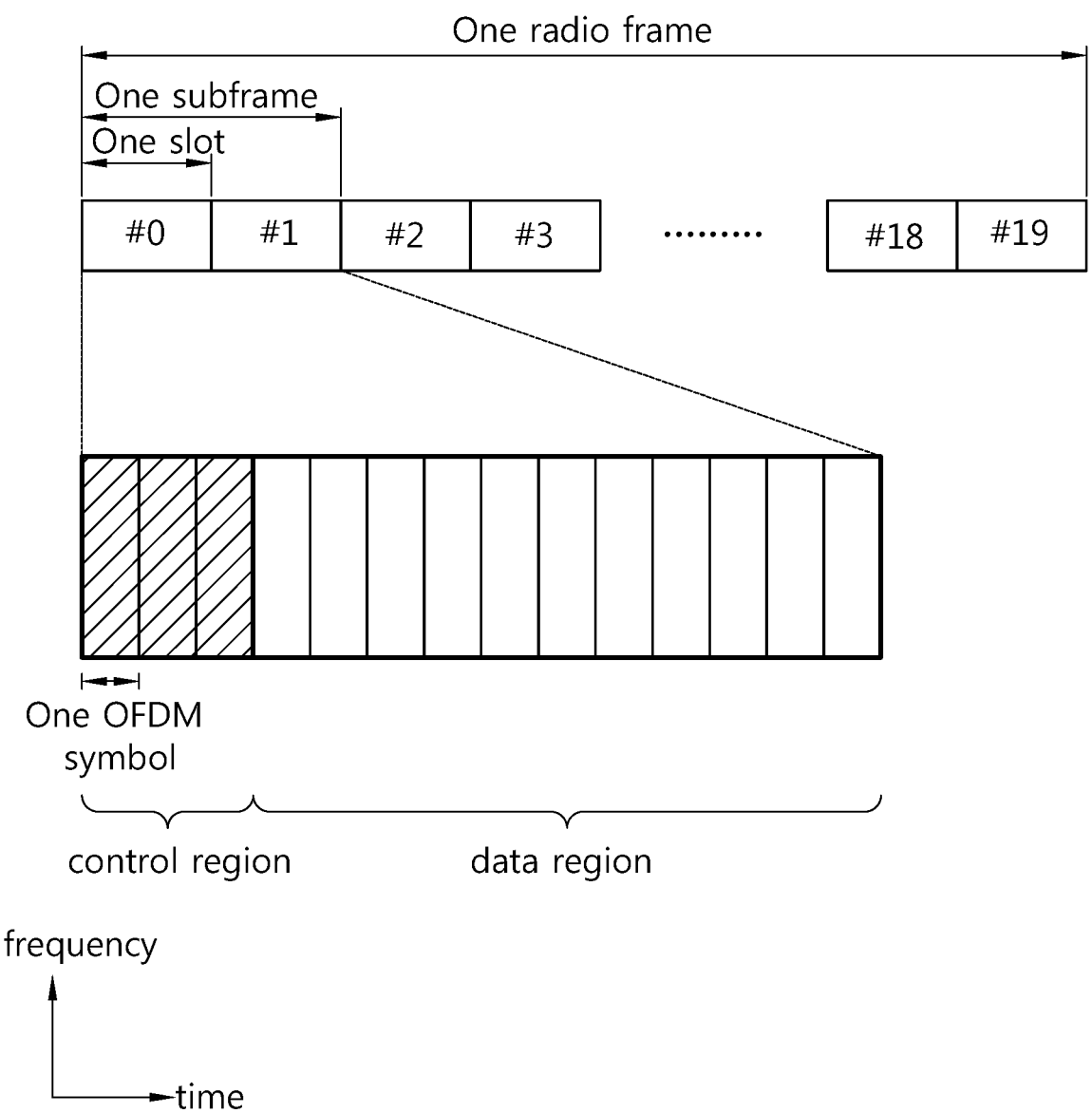
FIG. 6 is a view illustrating a structure of a downlink subframe.

FIG. 6 illustrates the architecture of a downlink sub-frame.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

Here, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

Figure 7:
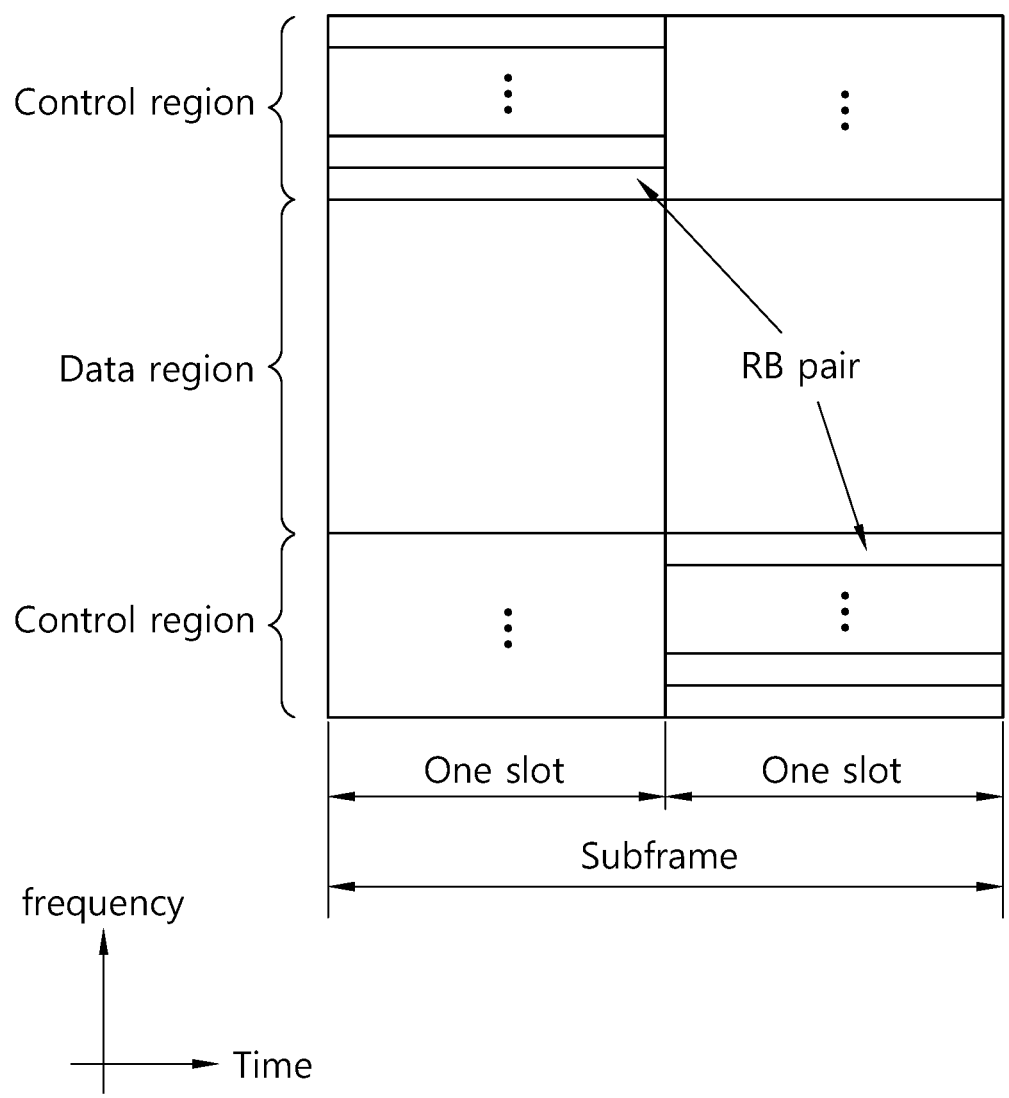
FIG. 7 is a view illustrating a structure of an uplink subframe in the 3GPP LTE.

FIG. 7 illustrates the architecture of an uplink sub-frame in 3GPP LTE.

Referring to FIG. 7, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary. The terminal may obtain a frequency diversity gain by transmitting uplink control information through different sub-carriers over time.

Figure 8:
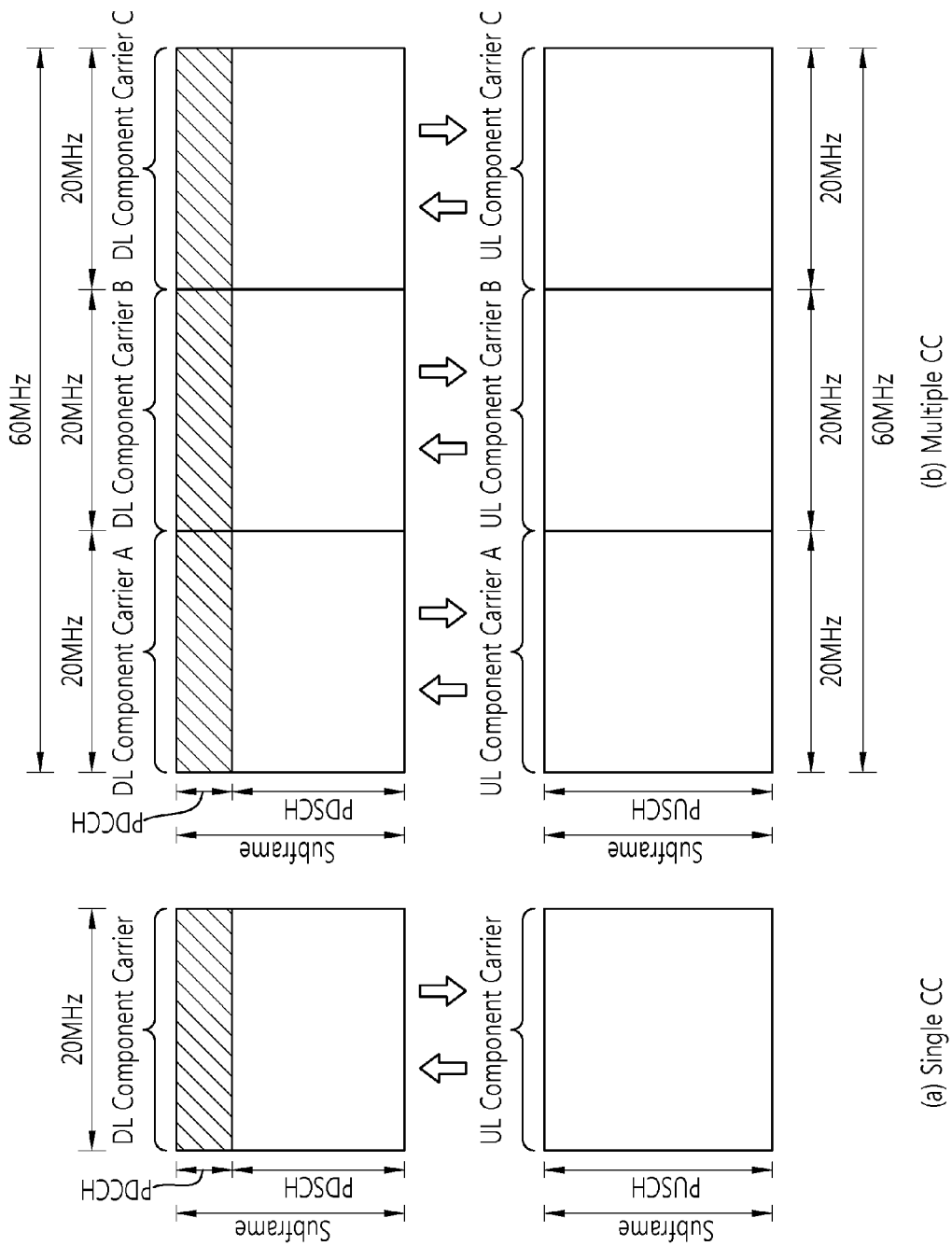
FIG. 8 is a view illustrating an example of comparison between an existing single carrier system and a carrier aggregation system.

FIGS. 8a and 8b illustrate an example of comparison between a single carrier system and a carrier aggregation system.

Referring to FIG. 8a, a typical FDD wireless communication system supports one carrier for uplink and downlink. In this case, the carrier may have various bandwidths, but only one carrier is assigned to the user equipment.

In other words, in the typical FDD wireless communication system, data transmission and reception is carried out through one downlink band and one uplink band corresponding thereto. The bit stream and the user equipment transmit and receive control information and/or data scheduled for each sub-frame. The data is transmitted/received through the data region configured in the uplink/downlink sub-frame, and the control information is transmitted/received through the control region configured in the uplink/downlink sub-frame. For this, the uplink/downlink sub-frame carries signals through various physical channels. Although the description in connection with FIG. 7 primarily focuses on the FDD scheme for ease of description, the foregoing may be applicable to the TDD scheme by separating the radio frame for uplink/downlink in the time domain.

As shown in FIG. 8a, data transmission/reception performed through one downlink band and one uplink band corresponding to the downlink band is referred to as a single carrier system.

Such single carrier system may correspond to an example of communication in the LTE system. Such 3GPP LTE system may have an uplink bandwidth and a downlink bandwidth that differ from each other, but supports up to 20 MHz.

Meanwhile, a high data transmission rate is demanded. The most fundamental and stable solution to this is to increase bandwidth.

However, the frequency resources are presently saturated, and various technologies are partially being in use in a wide range of frequency band. For such reason, as a method for securing a broad bandwidth to satisfy the demand for higher data transmission rate, each scattered band may be designed to meet basic requirements for being able to operate an independent system, and carrier aggregation (CA) whose concept is to bundle up multiple bands to a single system has been introduced.

That is, the carrier aggregation (CA) system means a system that constitutes a broadband by gathering one or more carriers each of which has a bandwidth narrower than the targeted broadband when supporting a broadband in the wireless communication system.

Such carrier aggregation (CA) technology is also adopted in the LTE-advanced (hereinafter, 'LTE-A'). The carrier aggregation (CA) system may also be referred to as a multiple-carrier system or bandwidth aggregation system.

In the carrier aggregation (CA) system, a user equipment may simultaneously transmit or receive one or more carriers depending on its capabilities. That is, in the carrier aggregation (CA) system, a plurality of component carriers (CCs) may be assigned to a user equipment. As used herein, the term "component carrier" refers to a carrier used in a carrier aggregation system and may be abbreviated to a carrier. Further, the term "component carrier" may mean a frequency block for carrier aggregation or a center frequency of a frequency block in the context and they may be interchangeably used.

FIG. 8b may correspond to a communication example in an LTE-A system.

Referring to FIG. 8b, in case, e.g., three 20 MHz component carriers are assigned to each of uplink and downlink, the user equipment may be supported with a 60 MHz bandwidth. Or, for example, if five CCs are assigned as granularity of the unit of carrier having a 20 MHz bandwidth, up to 100 MHz may be supported. FIG. 8b illustrates an example in which the bandwidth of an uplink component carrier is the same as the bandwidth of a downlink component carrier for ease of description. However, the bandwidth of each component carrier may be determined independently. When aggregating one or more component carriers, a targeted component carrier may utilize the bandwidth used in the existing system for backward compatibility with the existing system. For example, in a 3GPP LTE system, bandwidths of 1.4 MHz, 3 MHz, 5 MHz, 10 MHz, 15 MHz and 20 MHz may be supported. Accordingly, the bandwidth of an uplink component carrier may be constituted like 5 MHz (UL CC0)+20 MHz (UL CC1)+20 MHz (UL CC2)+20 MHz (UL CC3)+5 MHz (UL CC4), for example. However, without consideration of backward compatibility, a new bandwidth may be defined rather the existing system bandwidth being used, to constitute a broadband.

FIG. 8b illustrates an example in which the number of uplink component carriers is symmetric with the number of downlink component carriers for ease of description. As such, when the number of uplink component carriers is the same as the number of downlink component carriers is denoted symmetric aggregation, and when the number of uplink component carriers is different from the number of downlink component carriers is denoted asymmetric aggregation.

The asymmetric carrier aggregation may occur due to a restriction on available frequency bands or may be artificially created by a network configuration. As an example, even when the entire system band comprises N CCs, the frequency band where a particular user equipment may perform reception may be limited to M (<N) CCs. Various parameters for carrier aggregation may be configured cell-specifically, UE group-specifically, or UE-specifically.

Meanwhile, carrier aggregation systems may be classified into contiguous carrier aggregation systems where each carrier is contiguous with another and non-contiguous carrier aggregation systems where each carrier is spaced apart from another. A guard band may be present between the carriers in the contiguous carrier aggregation system. Hereinafter, simply referring to a multi-carrier system or carrier aggregation system should be understood as including both when component carriers are contiguous and when component carriers are non-contiguous.

Meanwhile, the concept of cell as conventionally appreciated is varied by the carrier aggregation technology. In other words, according to the carrier aggregation technology, the term "cell" may mean a pair of a downlink frequency resource and an uplink frequency resource. Or, the cell may mean a combination of one downlink frequency resource and an optional uplink frequency resource.

In other words, according to the carrier aggregation technology, one DL CC or a pair of UL CC and DL CC may correspond to one cell. Or, one cell basically includes one DL CC and optionally includes a UL CC. Accordingly, a user equipment communicating with a bit stream through a plurality of DL CCs may be said to receive services from a plurality of serving cells. In this case, although downlink is constituted of a plurality of DL CCs, uplink may be used by only one CC. In such case, the user equipment may be said to receive services from a plurality of serving cells for downlink and to receive a service from only one serving cell for uplink.

Meanwhile, in order for packet data to be transmitted/received through a cell, configuration for a particular cell should be completed. Here, the term "configuration" means the state where system information necessary for data transmission/reception on a corresponding cell is completely received. For example, the configuration may include the overall process of receiving common physical layer parameters necessary for data transmission/reception, MAC (media access control) layer parameters, or parameters necessary for a particular operation in RRC layer. The configuration-completed cell is in the state where packet transmission/reception is possible simply when information indicating that packet data may be transmitted is received.

The configuration-completed cell may be left in activation or deactivation state. Here, the term "activation" refers to data transmission or reception being performed or being ready. The UE may monitor or receive a control channel (PDCCH) or data channel (PDSCH) of an activated cell in order to identify resources (which may be frequency or time) assigned thereto.

Transmission or reception with a deactivated cell is impossible, while measurement or transmission/reception of least information is possible. The user equipment may receive system information (SI) necessary for receiving packets from a deactivated cell. In contrast, the user equipment does not monitor or receive the control channel (PDCCH) and data channel (PDSCH) of deactivated cells to identify resources (which may be frequency or time) assigned thereto.

In accordance with carrier aggregation technology, thus, activation/deactivation of a component carrier may be the same in concept as activation/deactivation of a serving cell. For example, assuming that serving cell 1 comprises DL CC1, activation of serving cell 1 means activation of DL CC1. Assuming that serving cell 2 is configured so that DL CC2 is connected with UL CC2, activation of serving cell 2 means activation of DL CC2 and UL CC2. In that regard, each component carrier may correspond to a serving cell.

On the other hand, a change in the concept of serving cell as conventionally understood by the carrier aggregation technology leads to primary cells and secondary cells being separated from each other.

The primary cell refers to a cell operating in a primary frequency and means a cell where the user equipment performs an initial connection establishment procedure or connection re-establishment procedure with a bit stream or a cell designated so during the course of handover.

The secondary cell means a cell operating in a secondary frequency, and is configured once an RRC connection is established and is used to provide additional radio resources.

The PCC (primary component carrier) means a component carrier (CC) corresponding to the primary cell. The PCC means a CC where the user equipment initially achieves connection (or RRC connection) with the base station among various CCs. The PCC is a special CC that is in charge of connection (or RRC connection) for signaling regarding multiple CCs and that manages UE context that is connection information relating to the UE. Further, the PCC, in case the PCC achieves connection with the UE so that it is in RRC connected mode, always remains in activated state. The downlink component carrier corresponding to the primary cell is referred to as a downlink primary component carrier (DL PCC), and the uplink component carrier corresponding to the primary cell is referred to as an uplink primary component carrier (UL PCC).

The SCC (secondary component carrier) means a CC corresponding to the secondary cell. That is, the SCC is a CC assigned to the user equipment, which is not the PCC, and the SCC is an extended carrier for the user equipment to assign additional resources other than the PCC. The SCC may stay in activated state or deactivated state. The downlink component carrier corresponding to the secondary cell is referred to as a downlink secondary component carrier (DL SCC), and the uplink component carrier corresponding to the secondary cell is referred to as an uplink secondary component carrier (UL SCC).

The primary cell and the secondary cell have the following features.

First, the primary cell is used for transmission of a PUCCH. Second, the primary cell always remain activated while the secondary cell switches between activation/deactivation depending on particular conditions. Third, when the primary cell experiences radio link failure (hereinafter, "RLF"), the RRC reconnection is triggered. Fourth, the primary cell may be varied by a handover procedure that comes together with security key changing or an RACH (Random Access CHannel) procedure. Fifth, NAS (non-access stratum) information is received through the primary cell. Sixth, in the case of an FDD system, the primary cell is constituted of a pair of DL PCC and UL PCC. Seventh, a different component carrier may be set as the primary cell for each user equipment. Eighth, primary cells may be exchanged only by a handover, cell selection/cell reselection process. In adding a new secondary cell, RRC signaling may be used to transmit system information of the dedicated secondary cell.

As described above, the carrier aggregation system may support a plurality of component carriers (CCs), i.e., a plurality of serving cells, unlike the single carrier system.

Such carrier aggregation system may support cross-carrier scheduling. The cross-carrier scheduling is a scheduling method that allows for resource allocation of a PDSCH transmitted through other component carrier through a PDCCH transmitted through a particular component carrier and/or resource allocation of a PUSCH transmitted through other component carrier than the component carrier basically linked with the particular component carrier. That is, a PDCCH and a PDSCH may be transmitted through different downlink CCs, and a PUSCH may be transmitted through an uplink CC other than an uplink CC linked with a downlink CC through which a PDCCH including a UL grant is transmitted. As such, the cross-carrier scheduling-supportive system requires a carrier indicator indicating a DL CC/UL CC through which a PDSCH/PUSCH through which a PDCCH provides control information is transmitted. The field containing such carrier indicator is hereinafter referred to as a carrier indication field (CIF).

The carrier aggregation system supportive of cross-carrier scheduling may include a carrier indication field (CIF) in the conventional DCI (downlink control information) format. A cross-carrier scheduling-supportive system, e.g., an LTE-A system, adds a CIF to the existing DCI format (i.e., DCI format used in LTE), so that it may be extended with three bits, and it may reuse the existing coding scheme, resource allocation scheme (i.e., CCE-based resource mapping) for the PDCCH structure.

Hereinafter, a reference signal will be described.

In general, transmission information, for example, data, is easily distorted or changed while being transmitted through a wireless channel. Thus, in order to demodulate such transmission information without an error, a reference signal is required. The reference signal, a signal known in advance between a transmitter and a receiver, is transmitted together with the transmission information. The transmission information transmitted from the transmitter undergoes a channel corresponding to each transmission antennas or each layer, and thus, the reference signal may be allocated for each transmission antenna or each layer. The reference signal for each transmission antenna or each layer may be discriminated by using resource such as a time, a frequency, or a code. The reference signal may be used for two purposes, that is, demodulation of transmission information and channel estimation.

Reference signals may be divided into two types of reference signals depending on a range of a receiver which already knows about the reference signals. A first type of reference signal is a reference signal that only a specific receiver (for example, a specific terminal) knows, and such a reference signal is called a dedicated reference signal (DRS). In this context, the DRS is also called a UE-specific R. A second type of reference signal is a reference signal that every receiver, for example, every UE, knows, and such a reference signal is called a common reference signal (CRS). The CRS is also called a cell-specific RS.

system, and such MIB information is retransmitted at every period of 10 ms with a very low coding rate four times such that all the terminals connected to the corresponding cell reliably receives the information, thus allowing for reception of the MIB information even in a considerably poor channel environment.

Meanwhile, MIB information having a total of 24 bits is defined in TS36.331 of the current. LTE standard as follows.

TABLE 1

```
-- ASN1START
MasterInformationBlock ::=    SEQUENCE {
    dl-Bandwidth                         ENUMERATED {
                                             n6, n15, n25, n50,
n75, n100},
    phich-Config                         PHICH-Config,
    systemFrameNumber                    BIT STRING (SIZE (8)),
    spare                                BIT STRING (SIZE (10))
}
-- ASN1STOP
```

Reference signals may also be classified according to purposes. For example, a reference signal used for demodulating data is called a demodulation reference signal (DM-RS), A reference signal used for feedback information indicating a channel state such as CQI/PMI/RI is called a channel state indicator-reference signal (CSI-RS). The foregoing DRS may be used as a DM-RS. Hereinafter, it is assumed that the DM-RS is a DRS.

Figure 9A:
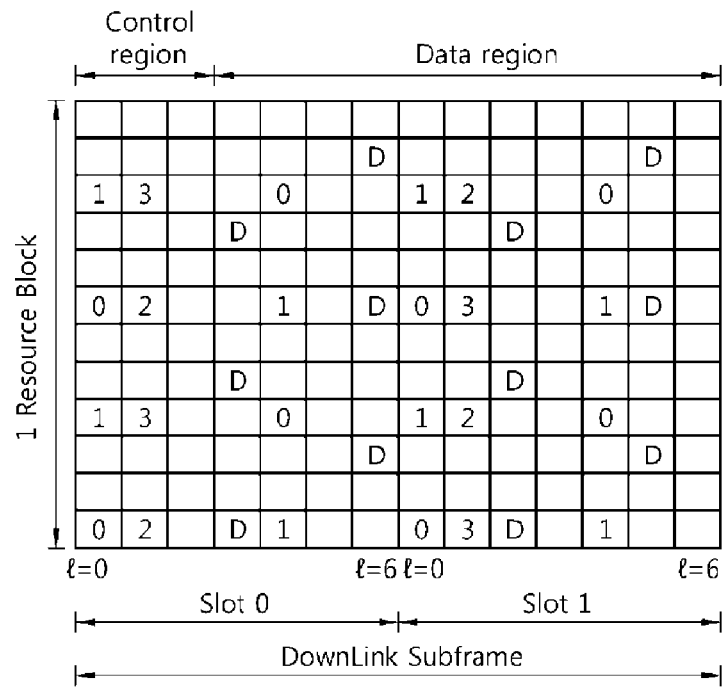
FIG. 9A is a view illustrating an example of an RS structure supporting four antenna ports in a normal CP.
Figure 9B:
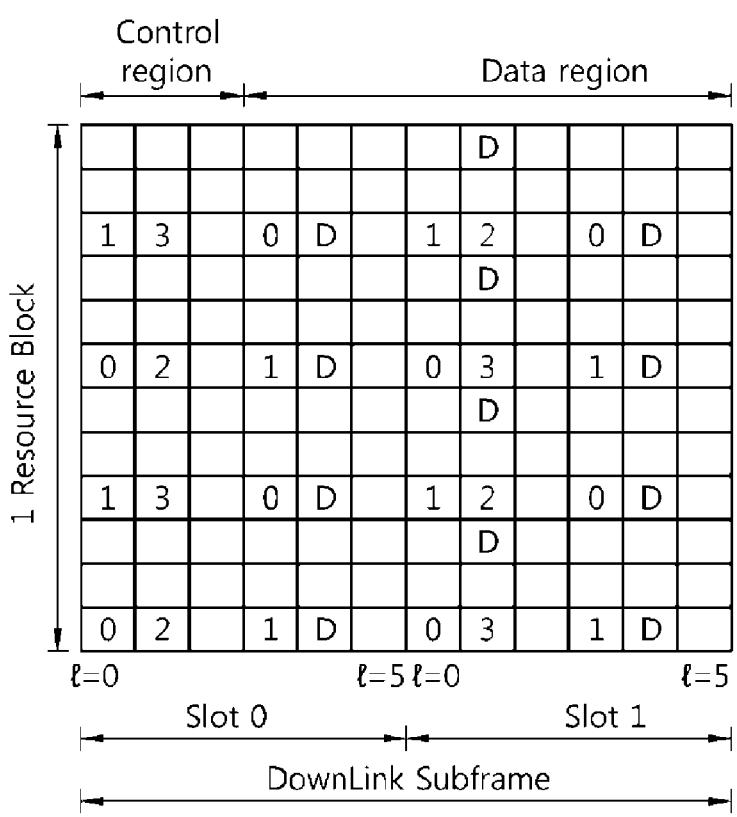
FIG. 9B is a view illustrating an example of an RS structure supporting four antenna ports in an extended CP.

FIG. 9A is a view illustrating an example of an RS structure capable of supporting four antenna ports in a normal CR FIG. 9B is a view illustrating an example of an RS structure capable of supporting four antenna ports in an extended CP.

The RS structures of FIGS. 9A and 9B are those used in the related art 3GPP LTE system.

In FIGS. 9A and 9B, resource elements in which any one of numbers from 0 to 3 are expressed indicate resource elements in which a cell-specific reference signal, i.e., a CRS, is transmitted. Here, any one of the numbers from 0 to 3 indicate a supported antenna port. That is, resource elements indicated by p (p is any one of 0 to 3) refer to resource elements to which a CRS with respect to an antenna port p is mapped. Such a CRS is used to perform channel measurement and data demodulation with respect to each antenna port. The CRS is transmitted in both a control region and a data region of a subframe.

In FIGS. 9A and 9B, resource elements indicated by 'D' denote resource elements to which a UE-specific reference signal, i.e., a DRS, is mapped. The UE-specific RS may be used for transmission of a single antenna port of a PDSCH. A UE is instructed as to whether a UE-specific RS is transmitted through a higher layer signal, or as to whether a UE-specific RS is valid when a PDSCH is transmitted. The UE-specific RS may be transmitted only when data demodulation is required. The UE-specific RS may be transmitted only in a data region of a subframe.

Figure 10:
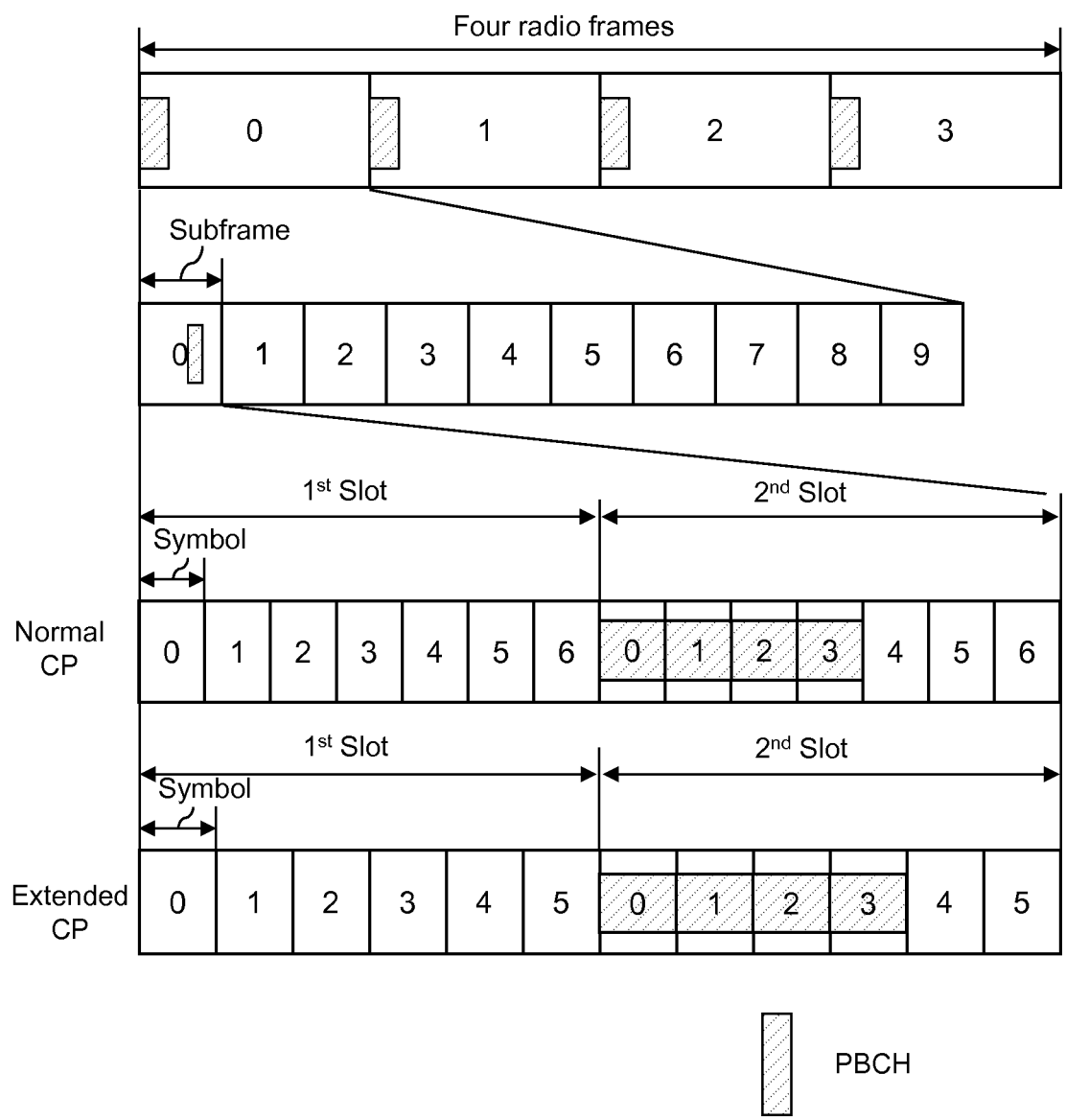
FIG. 10 is a view illustrating a frame structure for a physical broadcast channel (PBCH).

FIG. 10 is a view illustrating a frame structure for a PBCH (Physical Broadcast Channel).

As illustrated, a radio frame, subframe, and symbol numbers start from 0. A PBCH is transmitted in every radio frame, that is, in every 10 ms.

Also, as illustrated, the PBCH is transmitted on #0 subframe of each radio frame. In detail, the PBCH is transmitted on 0, 1, 2, and 3 symbols of the second slot.

The PBCH is used for each BS to transmit MIB (Master Information Block) most important for an operation of a As for the MIB information, when transmitted each time, in general, the same determined data is transmitted in each cell, excluding a systemFrameNumber field, and when an SIB (System Information Block) including the MIB needs to be changed for some reasons, it is informed to every UE within a cell through paging RRC signaling. Thus, PBCH reception by a UE is required only once in an initial cell detection, and afterwards, existing information is maintained until RRC(Radio Resource Control) signaling indicating that PBCH information of a serving cell has been updated is received, and an additional receiving process is not required.

Recently, a heterogeneous network in which a macro cell and a small cell coexist is under discussion. In particular, discussions for bypassing traffic by distributing a UE connected to a macro cell to a small cell are in progress.

Figure 11:
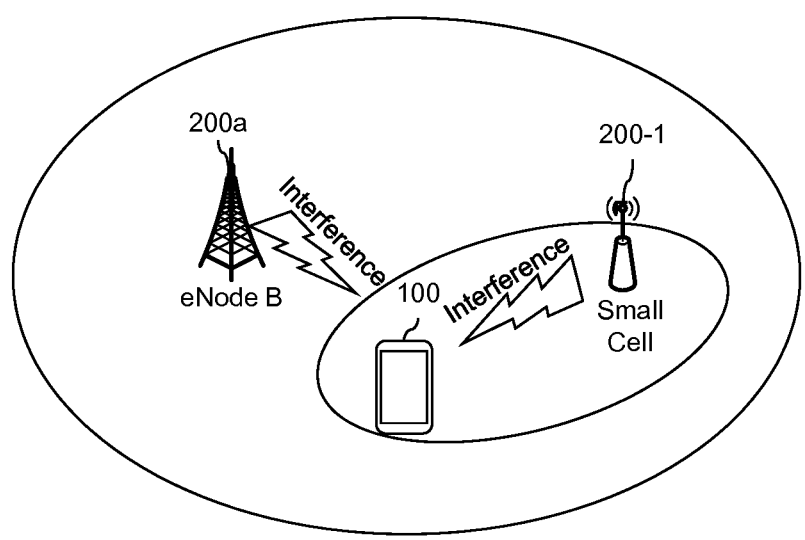
FIG. 11 is a view illustrating a heterogeneous network including a macro cell and a small cell.

FIG. 11 is a view illustrating a heterogeneous network including a macro cell and a small cell.

In a next-generation communication standard including a 3GPP LTE-A, a heterogeneous in which a small cell, for example, a pico cell, a femto cell, or a micro cell having low transmission power exist in an overlapping manner in existing macro cell coverage is under discussion.

Referring to FIG. 11, a macro cell may overlap one or more micro cells. A service of the macro cell is provided by a macro eNodeB (MeNB). In this disclosure, a macro cell and an MeNB may be mixedly used. A UE connected to the macro cell may be designated as a macro UE. The macro UE receives a downlink signal from the MeNB and transmits an uplink signal to the MeNB.

The small cell may also be designated as a femto cell, a pico cell, or a micro cell. A service of the small cell is provided by a pico eNodeB, a home eNodeB (HeNB), or a relay node (RN). For the purposes of description, the pico eNodeB, the HeNB, and the RN will be generally referred to as a home BS (HeNB). In this disclosure, a micro cell and the HeNB may be mixedly used.

In the heterogeneous network, since the macro cell and the small cell overlap, inter-cell interference may be problematic. As illustrated, when a UE is locate in a boundary between the macro cell and the small cell, a downlink signal from the macro cell may act as interference. Similarly, a downlink signal from the small cell may also act as interference.

For a specific example, when a UE 100 connected to a small cell 200-1 is located in the boundary of the small cell, the UE 100 may be disconnected from the small cell 200-1 due to interference from the macro cell 200, and this means that coverage of the small cell 200-1 is smaller than expected.

In another example, when the UE 100 connected to the macro cell 200 is in the region of the small cell 200-1, the UE 100 may be disconnected from the macro cell 200 due to interference from the small cell 200-1. This means that a shadow area is generated within the macro cell 200.

The most fundamental method for solve the interference problem is using different frequencies between heterogeneous networks. However, since a frequency is scarce and expensive resource, and thus, the solution based on frequency division is not welcomed to mobile carriers.

Thus, in 3GPP, such inter-cell interference is solved through time division.

Thus, recently, in 3GPP, eICIC (enhanced inter-cell interference coordination) has been actively researched as an interference cooperation method.

The time division scheme introduced to LTE Release-10 is called an enhanced ICIC (Enhanced inter-cell interference Coordination) in that it has been advanced compared with the existing frequency division scheme. According to the time division scheme, a cell causing interference is defined as an aggressor cell or a primary cell, an interfered cell is defined a victim cell or a secondary cell, and the aggressor cell or the primary cell stops data transmission in a specific subframe so that a UE may maintain connection with the victim cell or the secondary cell in the corresponding subframe. That is, in this method, when heterogeneous cells coexist, either cell temporarily stops signal transmission for a UE considerably interfered in a certain region and rarely transmits an interference signal.

A specific subframe in which the data transmission is stopped is called an almost blank subframe (ABS), and any data other than essential control information is not transmitted in the subframe corresponding to the ABS. The essential control information may be, for example, a cell-specific reference signal (CRS). In the current 3GPP LTE/LTE-A standard, the CRS signal exists in $0^{th}$, $4^{th}$, $7^{th}$, and $11^{th}$ OFDM symbols in a time axis. Thus, in the subframe as the ABS, only the CRS signal is transmitted on the $0^{th}$, $4^{th}$, $7^{th}$ and $11^{th}$ OFDM symbols.

Figure 12A:
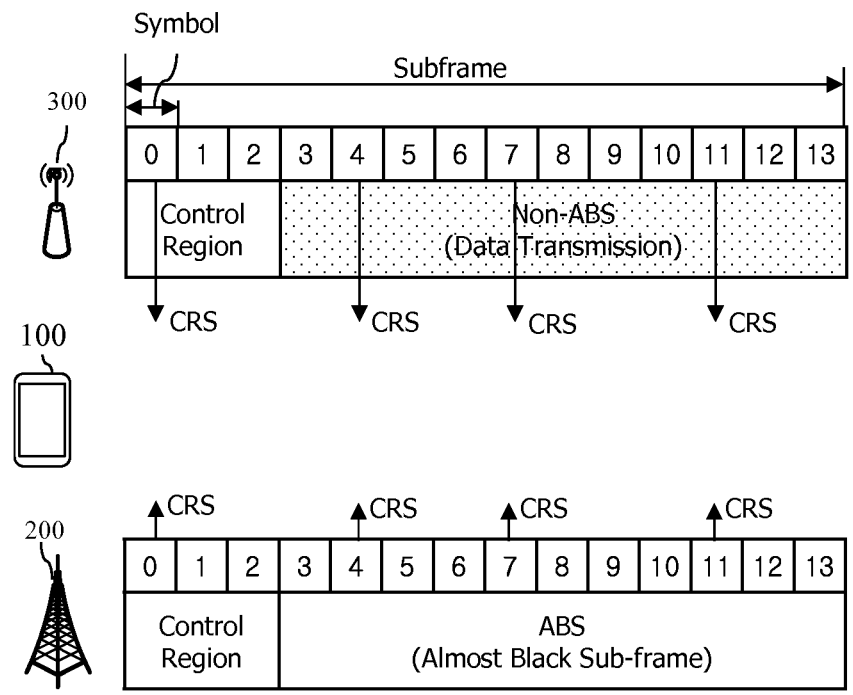
FIG. 12A is a view illustrating eICIC (enhanced Inter-Cell Interference Coordination) for solving interference between base stations.

FIG. 12A is a view illustrating eICIC (enhanced Inter-Cell Interference Coordination) for solving interference between base stations.

Referring to FIG. 12A, a first eNodeB 200a performs data transmission in a data region of an illustrated subframe, and CRSs are transmitted on $0^{th}$, $4^{th}$, $7^{th}$, and $11^{th}$ symbols.

Here, the second eNodeB 200b operates the illustrated subframe as an ABS.

That is, when the eICIC is applied to the second eNodeB 200b, a corresponding subframe is operated as an ABS and no data may be transmitted in the data region. However, in the subframe operated as an ABS, only CRS may be transmitted on the $0^{th}$, $4^{th}$, $7^{th}$, and $11^{th}$ symbols.

Figure 12B:
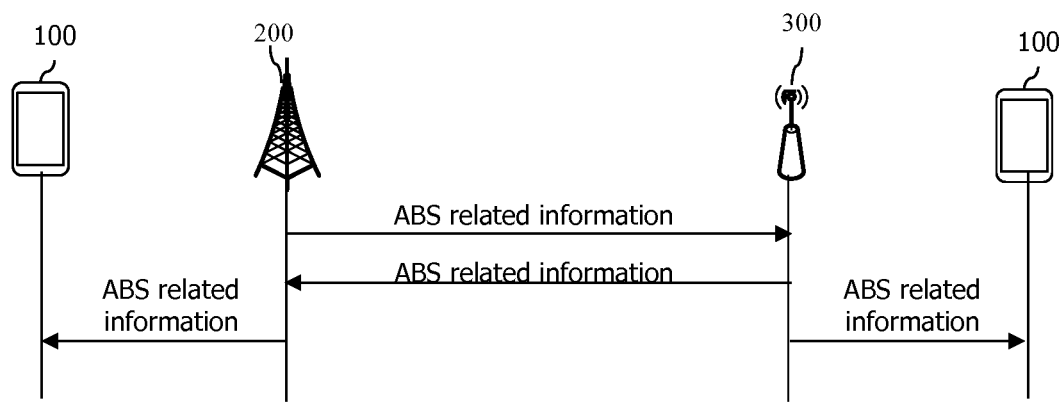
FIG. 12B is a view illustrating an example of exchanging ABS subframe-related information.

FIG. 12B is a view illustrating an example of exchanging ABS subframe-related information.

As can be seen with reference to FIG. 12B, ABS-related information may be exchanged between the first eNodeB 200a and the second eNodeB 200b through an X2 interface.

Also, the first eNodeB 200a and the second eNodeB 200b may transmit the ABS-related information to the serving UEs 100a and 100b thereof, respecdtively.

The first eNodeB 200a and the second eNodeB 200b may set a measurement subset for the serving UEs 100a and 100b thereof on the basis of one or more of the ABS-related information of their own and ABS-related information of a couterpart, and transmit the same.

Since the corresponding cell 200a or 200b does not transmit a downlink signal or transmit a downlink signal with reduced power on the downlink subframe set as an ABS, a magnitude of interference affecting coverage of other cell may be reduced, compared with a downlink subframe which is not set as an ABS. Thus, since a magnitude of interference may vary depending on whether a correspoding subframe has been set as an ABS, the UE 100 may perform measurement only on a previously designated specific subframe.

To this end, on teh basis of one or more of the ABS pattern informatin of their own and ABS pattern information of a counterpart, each of the cells 200a and 200b may instruct the serving UEs 100a and 100b thereof to perform measuement only on a specific subframe. This is called a restricted measurement. The instruction may be transmtited through higher layer signaling. The higher layer signaling may be RRC signaling. The signaling may be a CQI-ReportConfig element.

The ABS-related information includes ABS information and an ABS state.

First, the ABS information may include one or more of information elements shown in Table 2 below. ABS pattern inforamtion is information indicating a subframe to be used as an ABS, as a bitmap, and may be configured as a 40-bit bitmap in FDD and a maximum of 70-bit bitmap in case of TDD. For example, in case of FDD, 40 bits represent 40 subframes, and when a bit value is 1, it represents an ABS, and when the bit value is 0, it represents a genreal subframe (non-ABS), rather than an ABS. A measurement subset is a subset of ABS pattern information and is also cofnigured as a 40-bit bitmap in FDD and a maximum of 70-bit bitmap in TDD. Such a measurement subset is to set a restricted meaurement in a corresponding UE.

TABLE 2

| Information element | Description |
| --- | --- |
| ABS Pattern Information | In each position of a bitmap, a value "1" indicates an ABS and a value "0" indicates a non-ABS. A first position of an ABS Pattern corresponds to a subframe 0 in a radio frame of SFN = 0. The ABS pattern continuously appears in every radio frame. A maximum number of subframes is 40. |
| Measurement subset | It indicates a subset of ABS pattern information and is used to set UE-specific measurement. |
| ABS deactive | It indicates that interference coordination by ABS is not activated. |

An ABS status is used to determine whether a corresponding cell should change an ABS pattern. Available ABS pattern information is a subset of ABS pattern information, which also includes a bitmap. The available ABS pattern information indicates whether a subframe designated as an ASB has been properly used for the purpose of alleviating interference. A downlink ABS status, a ratio of the number of downlink resource blocks (RBs) scheduled in a subframe indicated in the available ABS pattern information and resource blocks (RBs) allocated for a UE to be protected through the ABS among the scheduled downlink resource blocks, represents information as to how effectively the ABS has been utilized for an intrinsic purpose in a victim cell.

TABLE 3

| Information element | Description |
| --- | --- |
| DL ABS status | It is a percentage of used ABS resources. The numerator of the percentage includes resource blocks in an ABS indicated in available ABS pattern information, and the denominator is a total number of resource blocks of aBS indicated in the available ABS pattern information. |
| Availability of ABS pattern information | Each position in a bitmap indicates a subframe, and a value "1" indicates an ABS designated to be protected by inter-cell interference, and a value "0" is used for all of the other subframes. A pattern expressed by a bitmap is configured as a subset of corresponding ABS pattern information or configured to be the same. |

The measurement subset configured as a subset of the ABS pattern information is a subframe used as an ABS, and other subframes included in the ABS pattern may determine as to whether a corresponding cell is to be autonomously utilized as an ABS according to a traffic load.

In addition to the solution of the inter-cell interference problem through the eICIC technique, a scheme of adding an interference cancelation capability to the UE 100.

When the interference cancelation capability is used, an inter-cell interference may be reduced, and thus, coverage of a small cell can be expanded. Details thereof will be described with reference to FIG. 13.

Figure 13:
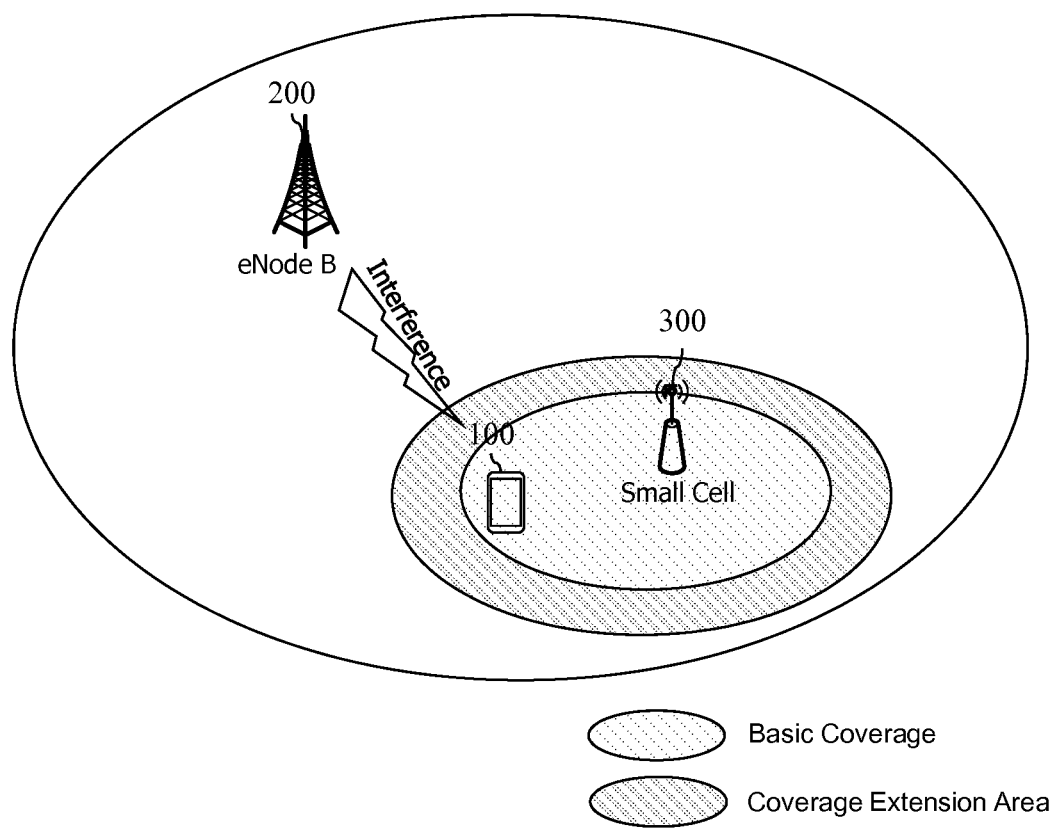
FIG. 13 is a view illustrating a concept of expanding coverage of a small cell according to an embodiment of the present disclosure.

FIG. 13 is a view illustrating a concept of expanding coverage of a small cell according to an embodiment of the present disclosure.

As illustrated in FIG. 13, a base station (e.g., a pico eNodeB) 300 of several small cells may be installed in coverage of a base station (e.g., an eNodeB) 200a of a macro cell. When a UE 100 which has been served by the BS 200a of the macro cell exists within coverage of the BS 300 of the small cell, the UE 100 may perform handover to the BS 300 of the small cell, obtaining an effect of offloading traffic of the BS 200a of the macro cell.

Here, handover from the BS 200a of the macro cell corresponding to a serving BS to the BS 300 of the small cell corresponding to a target BS is performed when strength of a reference signal of the target BS on the basis of strength (RSRP, RSRQ) of the reference signal received by the UE 100 from the serving BS is equal to or greater than a specific threshold value.

Here, even though strength of the received reference signal of the target BS is not greater than strength of received reference signal of the serving BS by the threshold value or greater, handover may be performed to the target BS by using a certain means additionally or by improving capability of the UE 100. Such an operation results in expanding a cell range or a cell radius of the BS (e.g., pico eNodeB) 300 of the small cell corresponding to the target BS. In the drawing, the coverage expanded area larger than the basic coverage of the small cell 300 is shown to be shaded. Such a coverage expanded area may be called a cell range expansion (CRE).

Here, when a threshold value used for general handover is expressed as $S_{th\_conv}$, an area available for CRE may be expressed as an area of $S_{th\_conv} \leq S_{received} \leq S_{th\_CRE}$.

Meanwhile, reception strength with respect to the reference signal from the small cell 300 may be expressed as RSRP/RSRQ measured by the UE 100.

In this manner, by expanding the basic coverage of the small cell 300 using the interference removal capability of the UE 100, an effect of offloading traffic to the small cell 300 may be obtained.

In other words, when the interference removal capability of the UE 100 is used, even though strength of a reference signal received from the small cell is not greater than strength of a reference signal received from the macro cell by more than a threshold value, handover to the small cell may be performed.

Hereinafter, a scheme of adding the interference removal capability will be described.

Figure 14:
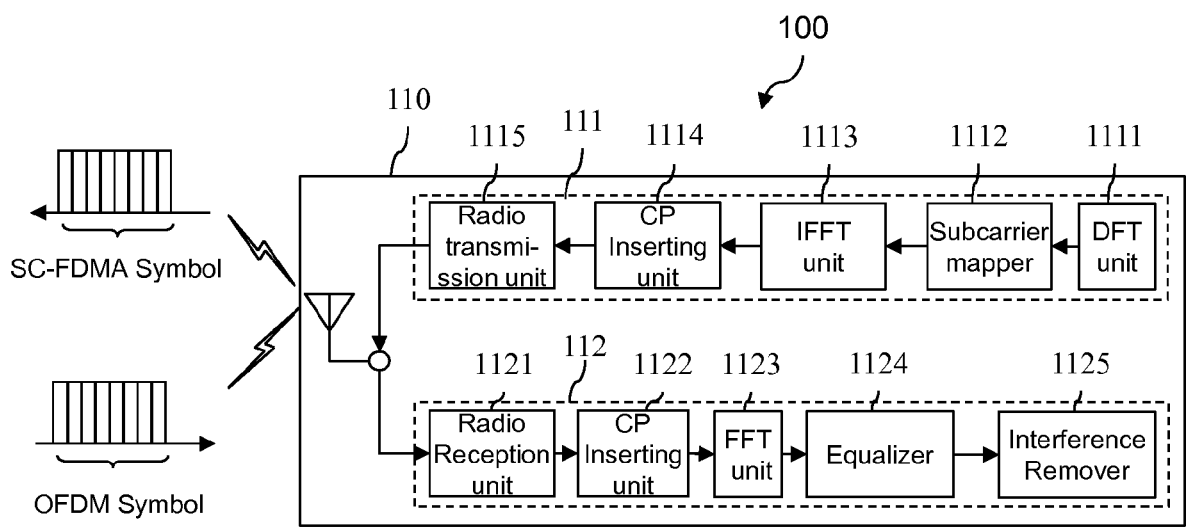
FIG. 14 is a block diagram illustrating a structure of a UE according to an embodiment of the present disclosure.

FIG. 14 is a block diagram illustrating the structure of UE according to one embodiment of the present specification.

In LTE or LTE-A, OFDM is used for a downlink and SC-FDMA similar to OFDM is used for an uplink.

SC-FDMA may also be referred to as discrete Fourier transform (DFT)-spread OFDM (DFT-s OFDM). When SC- is used, non-linear distortion of a power amplifier may be avoided, thus improving transmission power efficiency in a power consumption-limited terminal. Accordingly, user throughput may be enhanced.

SC-FDMA is substantially similar to OFDM in that SC-FDMA transmits signals via separate subcarriers using a Fast Fourier transform (FFT) and inverse FFT (IFFT). A conventional OFDM transmitter has a problem that signals in respective subcarriers on the frequency axis are converted into signals on the time axis by IFFT. That is, IFFT is a scheme of performing the same operation in parallel, and thus peak-to-average power ratio (PAPR) increases. To prevent increase in PAPR, SC-FDMA performs IFFT after DFT spreading, unlike OFDM. That is, a transmission mode in which IFFT is performed after DFT spreading is defined as SC-FDMA. Further, SC-FDMA is also referred to as DFT spread OFDM (DFT-s-OFDM).

SC-FDMA secures robustness to a multipath channel due to a similar structure to OFDM and basically resolves a disadvantage of conventional OFDM that is increase in PAPR by IFFT, thereby allowing efficient use of a power amplifier.

Referring to FIG. 14, the UE 100 includes a radio frequency (RF) unit 110. The RF unit 110 includes a transmitter 111 and a receiver 112. The transmitter 111 includes a discrete Fourier transform (DFT) unit 1111, a subcarrier mapper 1112, an IFFT unit 1113, a cyclic prefix (CP) insertion unit 1114, and a wireless transmission unit 1115. The transmitter 111 of the RF unit 110 may further include, for example, a scramble unit, a modulation mapper, a layer mapper, and a layer permutator, which may be disposed before the DFT unit 1111. That is, as described above, to prevent increase in PAPR, the transmitter of the RF unit 110 subjects data to the DFT unit 1111 before mapping a signal to a subcarrier. The signal spread (or precoded) by the DFT unit 1111 is mapped onto a subcarrier by the subcarrier mapper 1112 and subjected to the IFFT unit 1113 into a signal on the time axis.

That is, in SC-FDMA, unlike OFDM, PAPR of a signal in the time domain obtained via the IFFT unit 1113 is not substantially increased by correlations between the DFT unit 1111, the subcarrier mapper 1112, and the IFFT unit 1113, thereby providing favorable transmission power efficiency. That is, in SC-FDMA, PAPR or cubic meter (CM) may be decreased.

The DFT unit 1111 performs DFT on input symbols to output complex-valued symbols. For example, when Ntx symbols are input (here, Ntx is a natural number), DFT has a size of Ntx. The DFT unit 1111 may be referred to as a transform precoder. The subcarrier mapper 1112 maps the complex-valued symbols onto respective subcarriers in the frequency domain. The complex-valued symbols may be mapped onto resource elements corresponding to resource blocks allocated for data transmission. The subcarrier mapper 1112 may be referred to as a resource element mapper. The IFFT unit 1113 performs IFFT on the input symbols to output a baseband signal for data as a signal in the time domain. The CP insertion unit 1114 copies latter part of the baseband signal for data and inserts the latter part in front of the baseband signal for data. CP insertion prevents inter-symbol interference (ISI) and inter-carrier interference (ICI), thereby maintaining orthogonality even in a multipath channel.

Meanwhile, the 3GPP is actively carrying out standardization of LTE-Advanced, evolving from LTE, for which clustered DFT-s-OFDM allowing non-contiguous resource allocation is adopted.

Clustered DFT-s-OFDM is a modification of existing SC-FDMA, which divides data symbols having been subjected to a precoder into a plurality of sub-blocks and separately mapping the sub-blocks in the frequency domain. An important feature of clustered DFT-s-OFDM allows frequency selective resource allocation to deal with a frequency selective fading environment in a flexible manner.

Here, clustered DFT-s-OFDM adopted as an uplink access mode for LTE-Advanced allows non-contiguous resource allocation, unlike SC-FDMA as an uplink access for LTE, and thus transmitted uplink data may be divided into a plurality of cluster units.

That is, the LTE system is configured to maintain a single carrier characteristic in an uplink, whereas the LTE-A system allows non-contiguous allocation of DFT-precoded data to the frequency axis or simultaneous transmissions of a PUSCH and PUCCH.

Meanwhile, the receiver 112 of the RF unit 110 includes a wireless reception unit 1121, a CP cancellation unit 1122, an FFT unit 1123, an equalizer unit 1124, and an interference cancellation unit 1125. The wireless reception unit 1121, the CP cancellation unit 1122, and the FFT unit 1123 of the receiver perform reverse functions of the wireless transmission unit 1115, the CP insertion unit 1114, and the IFFT unit 1113 of the transmitter 111.

The interference cancellation unit 1125 cancels or relieve interference included in a received signal.

The interference cancellation unit 1125 is added for dealing with an explosively increasing demand for radio data and for canceling interference as in FIG. 12.

Figure 15:
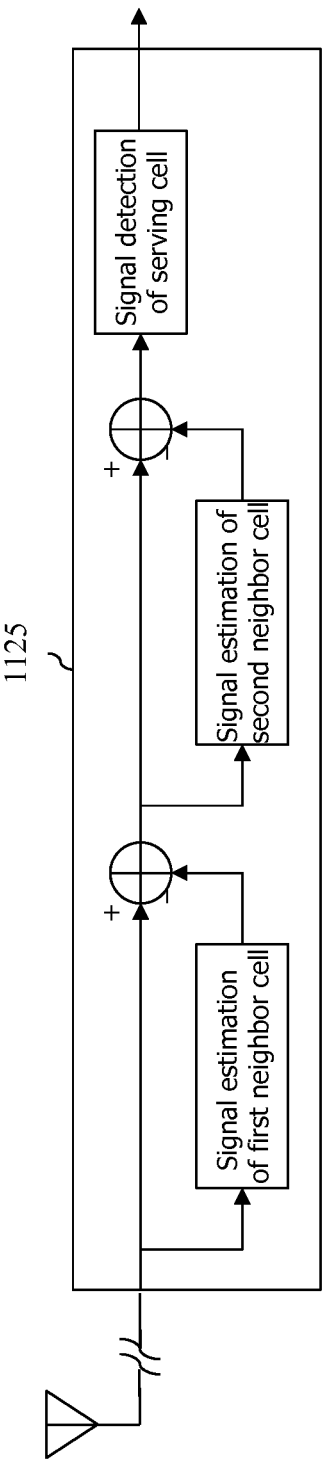
FIG. 15 is a block diagram illustrating an operation of an interference cancellation unit illustrated in FIG. 14.

FIG. 15 is a block diagram illustrating operations of the interference cancellation unit shown in FIG. 14.

The receiver 112 additionally including the interference cancellation unit 1125, which is called an interference cancellation (IC) receiver or interference rejection combiner (IRC) receiver, is configured to subtract an interference signal from a received signal.

Here, complexity of the receiver additionally including the interference cancellation unit 1125 depends on a maximum number of cells as an interference cancellation target and kinds of signals to be cancelled. FIG. 15 illustrates operations of performing interference cancellation of up to two interference sources.

The reception unit, so-called IC reception unit or the IRC reception unit, to which the interference cancellation unit 1125 is added may cope with the recently exploding demand for wireless data. In particular, since reception performance may be enhanced without significantly increasing complexity, a significantly large performance gain may be obtained in an environment in which interference is mainly caused by an adjacent BS.

When the interference cancellation capability is used as described above, an area may be expanded up to 6 dB, that is, a cell range extension (CRE) may be obtained.

Also, in addition, in the Rel-11 standard, a FeICIC function allowing for expansion of the CRE area up to 9 dB by extending eICIC, has been newly added.

In the FeICIC technique, a signal having reception power greater than that of a serving cell by up to 9 dB may be transmitted from an interference cell, and even though most transmitted signals are empted by the ABS, a PBCH is still introduced from the interference cell.

Figure 16A:
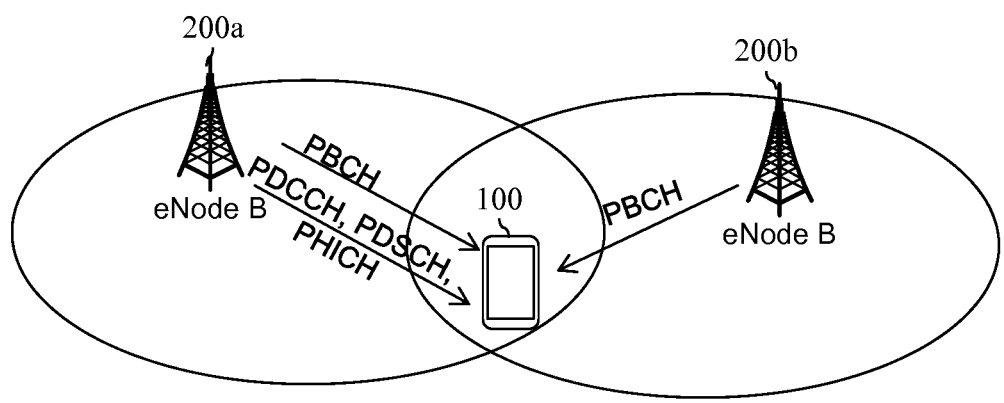
FIGS. 16A and 16B are views illustrating a situation in which a PBCH is introduced from an interference cell.
Figure 16B:
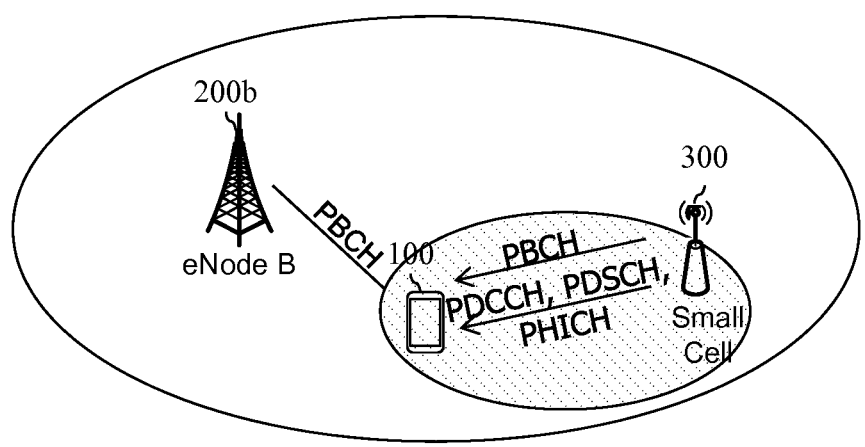

FIGS. 16A and 16B are views illustrating a situation in which a PBCH is introduced from an interference cell.

Referring to FIG. 16A, a situation in which a serving cell of a UE 100 is a first eNodeB 200a and a neighbor cell causing interference is a second eNodeB 200b is illustrated. When the second eNodeB 200b, a neighbor cell causing interference, transmits a PBCH, the PBCH may interfere in any one of a PBCH, PDCCH, PDSCH, PCFICH, and PHICH from the first eNodeB, a serving cell.

Meanwhile, referring to FIG. 16B, a situation in which, when the small cell 300 exists in an overlapping manner within coverage of the second eNodeB 200b corresponding to a macro cell, a serving cell of the UE 100 is the small cell 300 and a neighbor cell causing interference is the second eNodeB 200b is illustrated. Even in this case, similarly, when the second eNodeB 200b causing interference transmits a PBCH, the PBCH may interfere in any one of PBCH, PDCCH, PDSCH, PCFICH, and PHICH from the small cell 300 as a serving cell.

FIGS. 17A through 17D are views illustrating an influence when a PBCH is introduced from an interference cell.

Figure 17A:
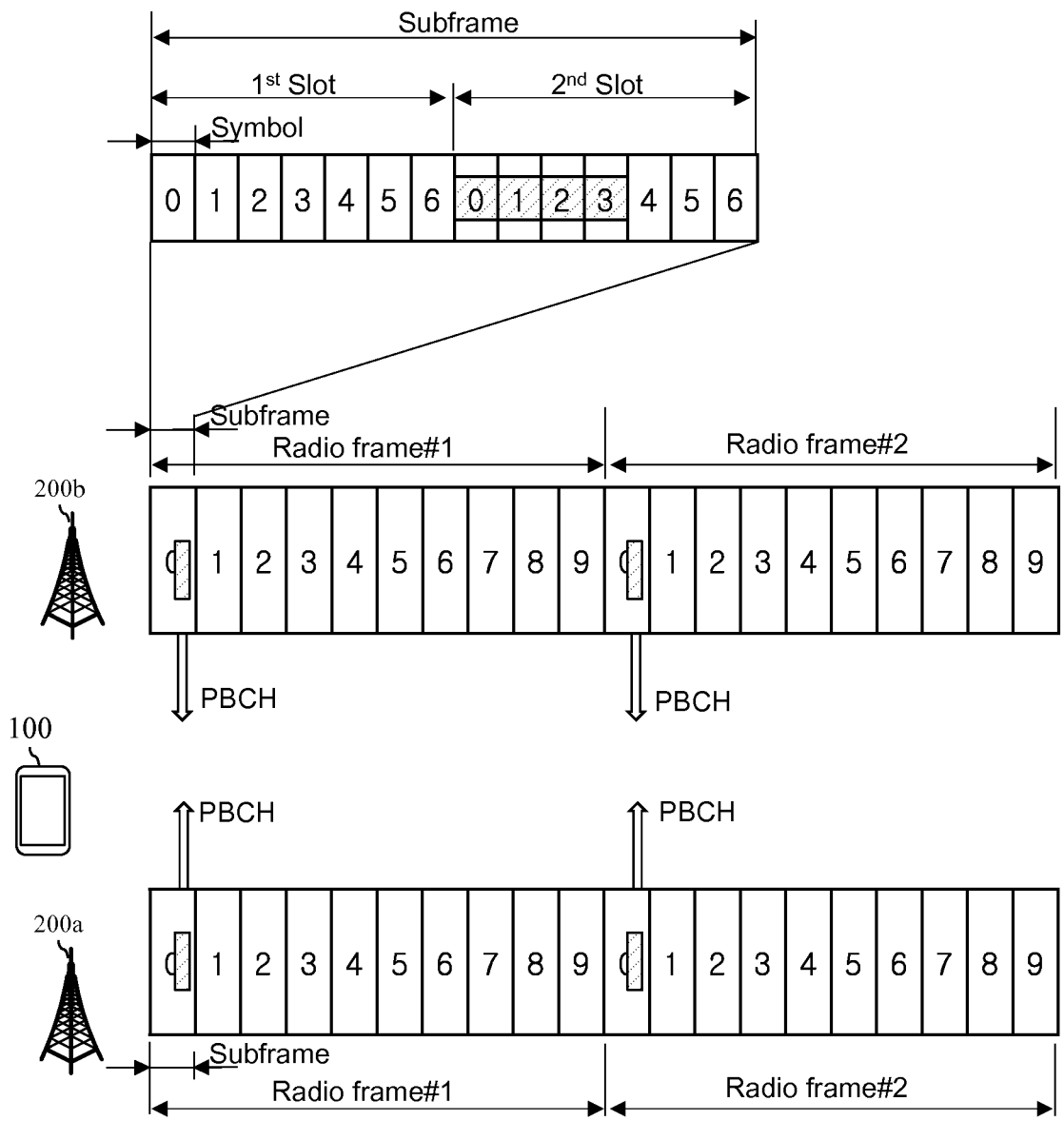
FIGS. 17A through 17D are views illustrating an influence when a PBCH is introduced from an interference cell.

First, as can be seen with reference to FIG. 17A, in a case in which downlink is synchronized between a first eNodeB 200a corresponding to a serving cell of the UE 100, and a second eNodeB 200b (or a small cell) corresponding to a neighbor interference cell (i.e., when a timing offset is 0), a PBCH from the interference cell 200b interferes in a PBCH of the serving cell 200a.

Figure 17B:
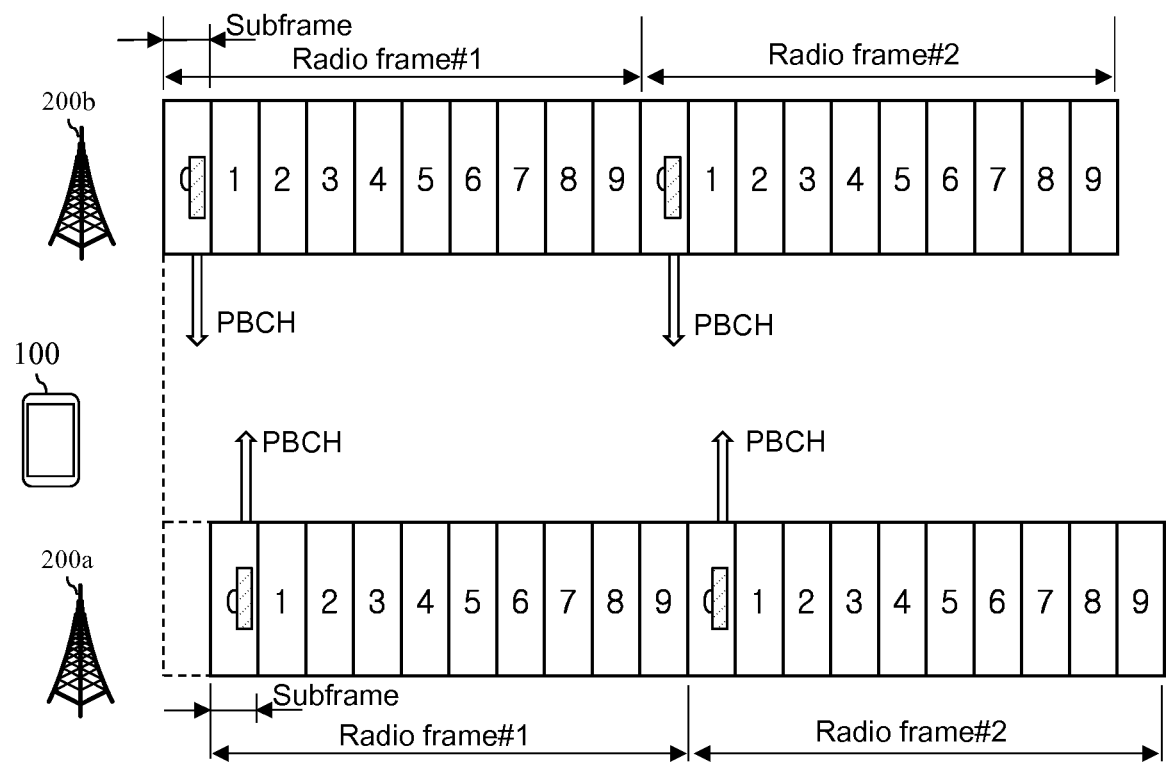

However, as can be seen with reference to FIG. 17B, in a case in which downlink synchronization is not matched between the serving cell 200 and the neighbor interference cell 200b and the timing offset is a subframe unit, a PBCH from the interference cell 200b interferes in downlink data (e.g., a PDSCH).

Figure 17C:
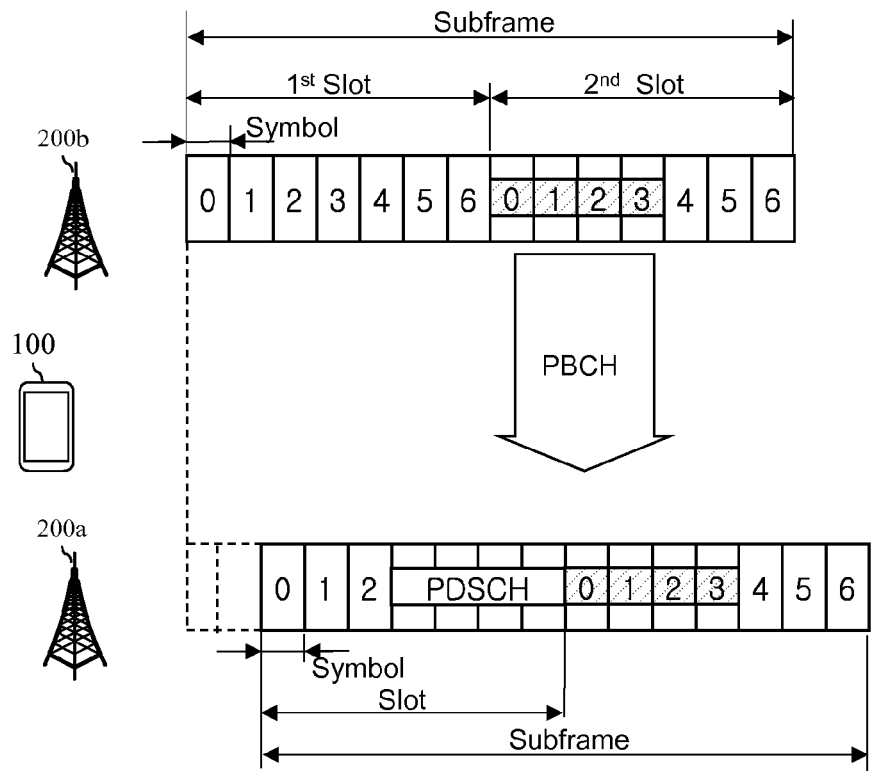

Similarly, as can be seen with reference to FIG. 17C, in a case in which downlink synchronization is not matched between the serving cell 200a and the neighbor cell 200b and a timing offset thereof is 1 to 6 symbols or 11 to 13 symbols, a PBCH from the interference cell 200b interferes in downlink data (e.g., a PDSCH) from the serving cell 200a.

Figure 17D:
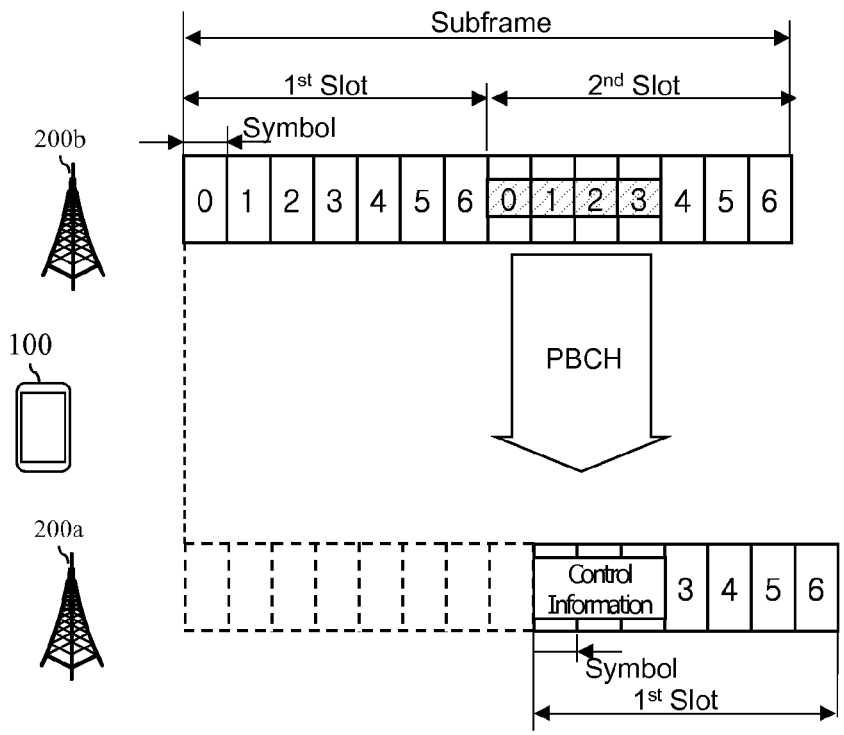

As can be seen with reference to FIG. 17D, in a case in which downlink synchronization is not matched between the serving cell 200a and the neighbor cell 200b and a timing offset thereof is 7 or 8 symbols, a PBCH from the interference cell 200b interferes in control information (e.g., a PDCCH, a PCFICH, or a PHICH) from the serving cell 200a.

Although not shown, in a case in which a downlink timing offset between the serving cell 200a and the neighbor interference cell 200b is 9 and 10 symbols, a PBCH from the interference cell 200b interferes in the control information e.g., a PDCCH, a PCFICH, or a PHICH) as well as downlink data (e.g., a PDSCH) from the serving cell 200a.

As can be seen with reference to FIGS. 17A through 17D, the UE 100 should cancel interference by the PBCH from the neighbor interference cell 200b.

In this case, as illustrated in FIG. 17A, in a case in which the PBCH from the interference cell 200b interferes in the PBCH of the serving cell 200a, in general, when the PBCH of the serving cell 200a is received at an initial stage once, the UE 100 does not need to receive the PBCH again until when RRC(Radio Resource Control) signaling indicating that PBCH information has been updated is received. Thus, the UE 100 may need only cancel interference by the PBCH from the neighbor interference cell 200b only when the PBCH from the serving cell 200a is received at the initial stage.

However, in the situations illustrated in FIGS. 17B through 17D, the UE 100 periodically cancel interference by the PBCH from the neighbor interference cell 200b. In particular, the UE 100 connected to the serving cell 200a cannot receive RRC signaling regarding updating of an MIB of the neighbor interference cell 200b, and thus, the UE 100 should cancel interference by the PBCH from the neighbor interference cell 200b once at every radio frame, namely, at every 10 ms.

However, in order to perform interference cancellation (IC) on the PBCH introduced from the neighbor interference cell 200b, the UE 100 should first estimate a channel, decode the PBCH transmitted from the neighbor interference cell 200b, encodes the PBCH again, and subsequently performs regeneration using the estimated channel value, which is, however, very complicated. Also, in order to decode the PBCH transmitted from the neighbor interference cell 200b, information regarding the number of antennas of the neighbor interference cell 200b. To this end, blind decoding should be performed, aggravating complexity. Also, a considerable amount of time is required to decode a signal from the serving cell 200a, and in this state, decoding even the PBCH transmitted from the neighbor interference cell 200b delays a decoding time.

If, however, the decoding portion of the PBCH of the interference cell for removing the PBCH of the neighbor interference cell 200b could be omitted, the UE may simply need only regenerate an interference reception signal, significantly reducing complexity.

Thus, embodiments of the present disclosure will be described hereinafter.

Figure 18:
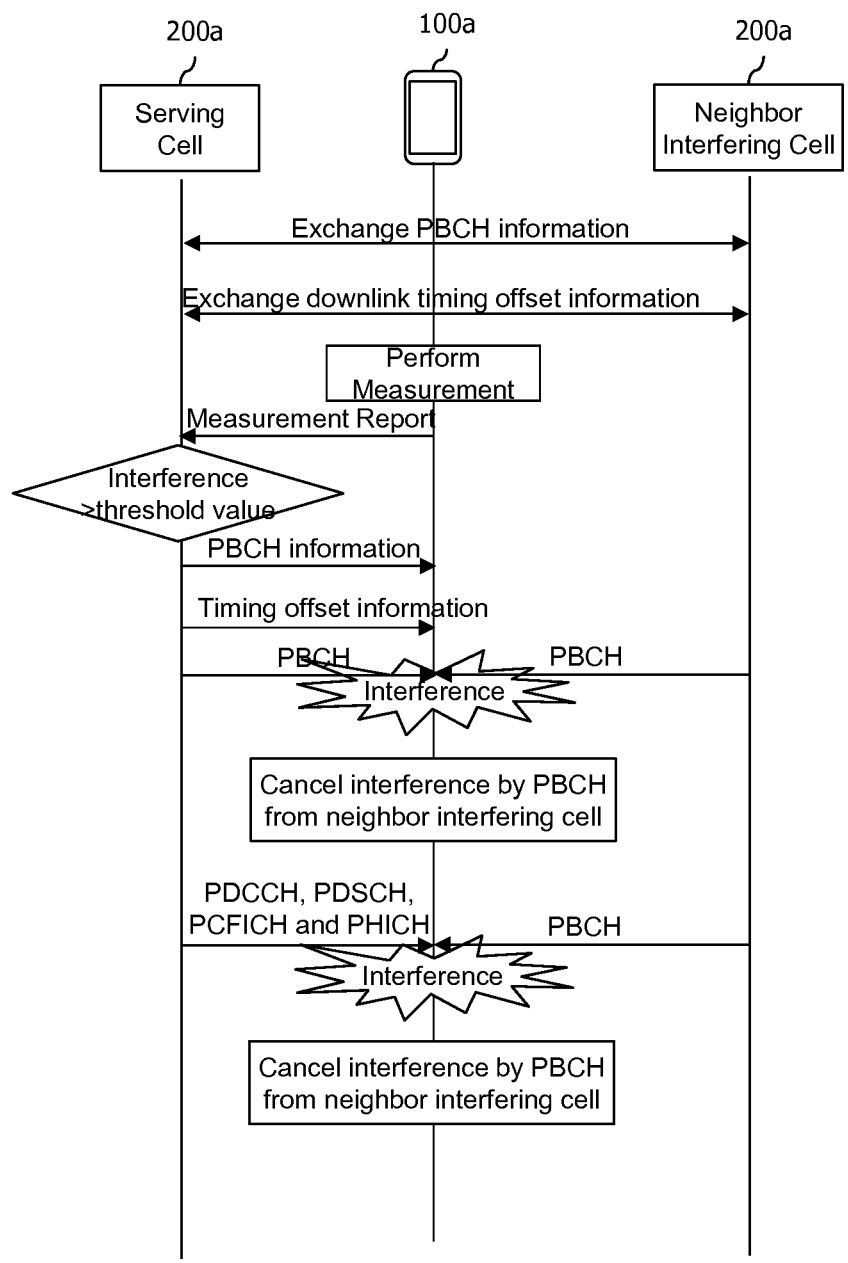
FIG. 18 is a signal flow chart according to an embodiment of the present disclosure.

FIG. 18 is a signal flow chart according to an embodiment of the present disclosure.

As can be seen with reference to FIG. 18, in order to prevent the UE 100 from decoding a PBCH from the neighbor interference cell 200b, the serving cell 200a may exchange PBCH information of the neighbor interference cell 200b and transfer the same to the UE 100. The PBCH information may include, for example, a system bandwidth, the number of antennas, PHICH information, a scrambling code seed, and a system frame number (SFN) offset (with respect to the serving cell). Here, the scrambling code seed may be a cell ID of the neighbor interference cell.

Meanwhile, as can be seen with reference to FIG. 18, the serving cell 200a may exchange information regarding downlink synchronization, namely, timing offset information, with the neighbor interference cell 200b, and transfer the same to the UE 100. The timing offset information may be expressed by slot or subframe unit. As described above, the timing offset information is important, and the reason is because, one of PBCH, PDCCH, PDSCH, PCFICH, and PHICH is identified as a signal of the serving cell 200a suffering an interference by the PBCH of the neighbor interference cell 200b according to how many the timing offset. In the related art, in order to obtain such timing offset information, the UE 100 itself should detect a synchronization signal of the neighbor interference cell 200b, for example, a PSS (Primary Synchronization Signal) and a SSS (Secondary Synchronization Signal). However, in order to accurately detect the synchronization signals PSS and SSS of the neighbor interference cell 200b, interference from other neighbor cell should be canceled additionally, increasing complexity. Thus, as illustrated in FIG. 18, it may be more effect for the serving cell 200a to transfer information regarding the neighbor interference cell 200b and the downlink timing offset to the UE 100. Thus, the UE 100 may reduce a searching window section. Also, an operation for the UE 100 to search for a cell timing may be omitted. Also, information regarding the downlink timing offset between the serving cell 200a and the neighbor interference cell 200b is small in size, and thus, overhead is not large.

The PBCH information and timing offset information of the neighbor interference cell 200b described above may be defined as support information for canceling PBCH interference.

Meanwhile, when transmission of the support information (i.e., the PBCH information and the timing offset information) for canceling PBCH interference is performed always, latency may increase, and thus, conditions for transferring information may be set. For example, when the serving cell 200a receives signal quality measurement result performed by the UE 100, the serving cell 200a may compare a magnitude of interference by the neighbor interference cell 200b and a magnitude of a serving cell signal, transfer the support information for canceling PBCH interference only to a UE 100 suffering interference of a certain level or higher. In detail, for example, in a case in which it is checked that a magnitude of the interference signal by the neighbor interference cell is greater than a predetermined threshold value according to the measurement result, the serving cell 200a may transfer the support information for canceling PBCH interference.

As described above, when the support information for canceling PBCH interference (i.e., PBCH information and timing offset information of the neighbor interference cell) is received, the UE 100 identifies one of PBCH, PDCCH, PDSCH, PCFICH, and PHICH as the signal of the serving cell 200a suffering an interference by the PBCH of the neighbor interference cell 200b on the basis of the timing offset information.

When the PBCH of the serving cell 200a is identified to suffer interference and when the UE 100 receives RRC signaling indicating that MIB information of the serving cell 200a has been changed, the UE 100 cancels interference by the PBCH of the neighbor interference cell 200b, thus receiving the PBCH of the serving cell 200a.

When a signal, for example, PDCCH, PDSCH, PCFICH, or PHICH, other than the PBCH of the serving cell 200a, is identified to suffer interference, the UE 100 cancels interference by the PBCH of the neighbor interference cell 200b, thus receiving the signal other than the PBCH of the serving cell 200a.

Figure 19:
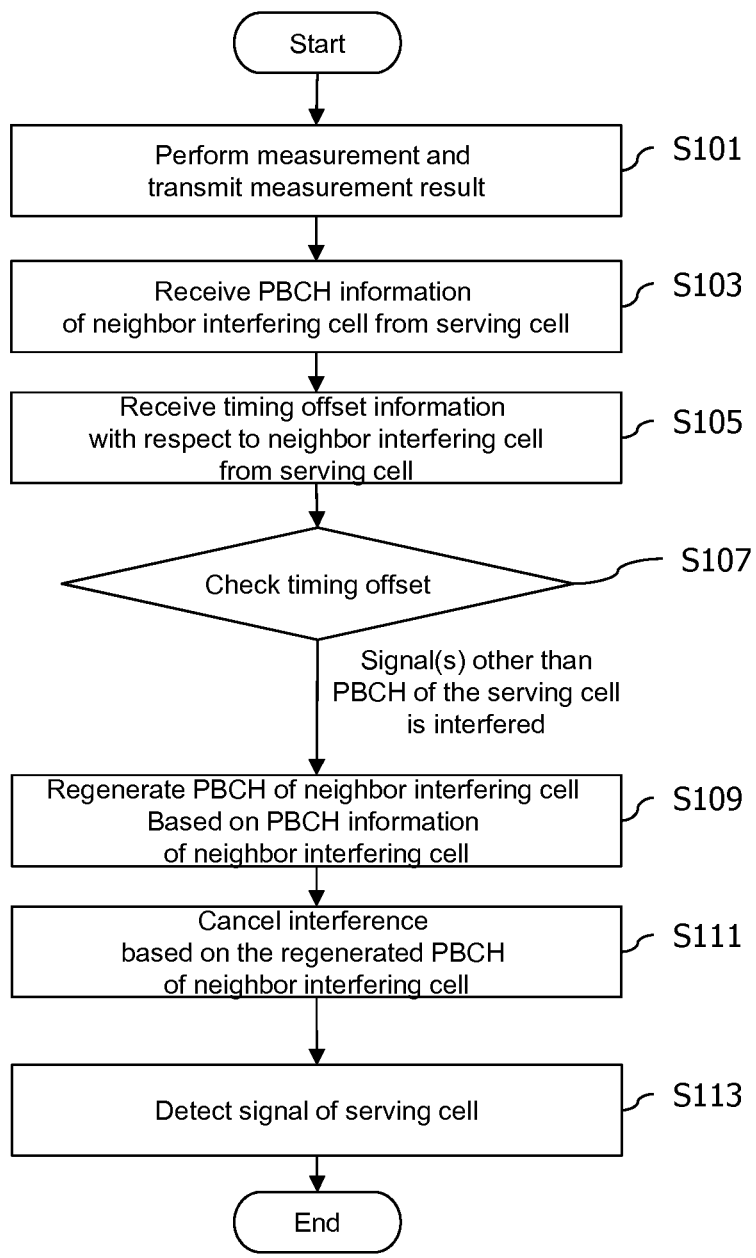
FIG. 19 is a flow chart illustrating a method of a terminal according to an embodiment of the present disclosure.

FIG. 19 is a flow chart illustrating a method of a terminal according to an embodiment of the present disclosure.

As can be seen with reference to FIG. 19, the UE 100 may perform measurement and transmits the measurement result to the serving cell 200a (S101). Here, the serving cell 200a may determine whether to transmit the support information (i.e., the PBCH information and timing offset information of the neighbor interference cell) for cancelling PBCH interference on the basis of the measurement result.

Thereafter, when the UE 100 receives the support information (i.e., the PBCH information and timing offset information of the neighbor interference cell) for cancelling PBCH interference (S103, S105), the UE 100 checks the timing offset information (S107). According to the timing offset information, the UE identifies one of the PBCH, PDCCH, PDSCH, PCFICH, and PHICH as a signal of the serving cell 200*a* suffering interference by the PBCH of the neighbor interference cell 200*b*. When a signal, for example, PDCCH, PDSCH, PCFICH, and PHICH, other than the PBCH, is identified to suffer interference, the UE 100 encodes the PBCH of the neighbor interference cell on the basis of the PBCH information of the neighbor interference cell 200*b*, and regenerates a PBCH of the neighbor interference cell 200*b* by using the encoded PBCH and the channel estimation result.

Subsequently, the UE 100 cancels the interference by the PBCH of the neighbor interference cell 200*b* by using the regenerated PBCH of the neighbor interference cell 200*b* (S1110, thus detecting a signal from the serving cell 200*a* (S113).

The embodiments illustrated above may be implemented by various instruments. For example, the embodiments of the present invention may be implemented by hardware, firmware, software, or combinations thereof, which will be described in detail with reference to FIG. 13.

Figure 20:
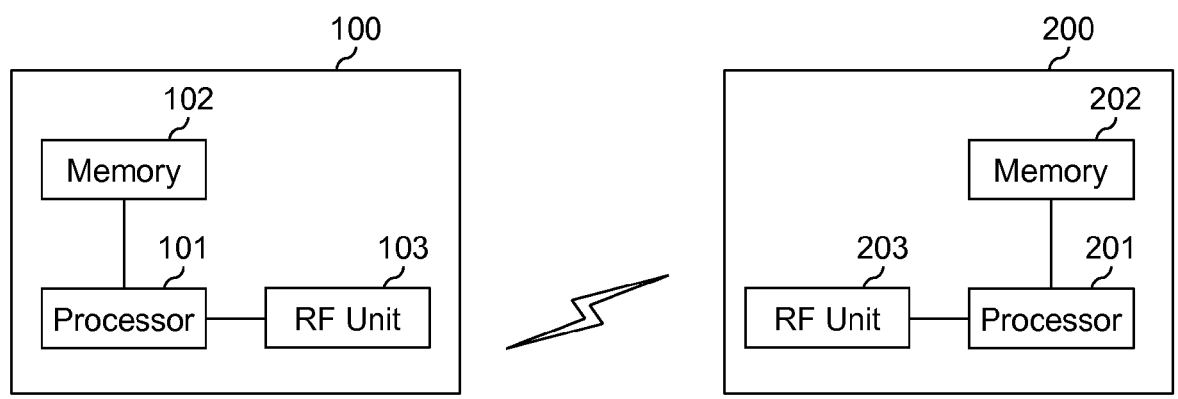
FIG. 20 is a block diagram illustrating a wireless communication system implementing an embodiment of the present disclosure.

FIG. 20 is a block diagram illustrating a wireless communication system according to an embodiment of the present invention.

A BS 200 includes a processor 201, a memory 202, and an RF (radio frequency) unit 203. The memory 202 coupled to the processor 201 stores a variety of information for driving the processor 201. The RF unit 203 coupled to the processor 201 transmits and/or receives a radio signal. The processor 201 implements the proposed functions, procedure, and/or methods. In the aforementioned embodiment, an operation of the BS may be implemented by the processor 201.

A wireless device 100 includes a processor 101, a memory 102, and an RF unit 103. The memory 102 coupled to the processor 101 stores a variety of information for driving the processor 101. The RF unit 103 coupled to the processor 101 transmits and/or receives a radio signal. The processor 101 implements the proposed functions, procedure, and/or methods. In the aforementioned embodiment, an operation of the wireless device may be implemented by the processor 101.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a baseband circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method for receiving a signal using an interference cancellation, the method comprising:
   receiving, by a terminal, information regarding a Physical Broadcast Channel (PBCH) of a neighbor interference cell from a serving cell;
   receiving, by the terminal, information regarding a downlink synchronization with the neighbor interference cell from the serving cell;
   identifying, by the terminal, a channel of the serving cell suffering an interference by the PBCH of the neighbor interference cell according to the information regarding the downlink synchronization with the neighbor interference cell; and
   canceling, by the terminal, the interference for receiving the identified channel using the information regarding the PBCH of the neighbor interference cell,
   wherein the information regarding the downlink synchronization with the neighbor interference cell includes information on a timing offset between the serving cell and the neighbor interference cell, and
   wherein the information on the timing offset is expressed by a number of slots.

2. The method of claim 1, wherein the information on the timing offset is further expressed by a number of subframes.

3. The method of claim 1, wherein when the timing offset is 0, the channel of the serving cell suffering the interference by the PBCH of the neighbor interference cell is identified as a PBCH.

4. The method of claim 1, wherein
   when the timing offset is a subframe unit or 1 to 6 symbols or 11 to 13 symbols, the channel of the serving cell suffering the interference by the PBCH of the neighbor interference cell is identified as a Physical Downlink Shared Channel (PDSCH),
   when the timing offset is 7 or 8 symbols, the channel of the serving cell suffering the interference by the PBCH of the neighbor interference cell is identified as one of a Physical Downlink Control Channel (PDCCH), a Physical Control Format Indicator Channel (PCFICH), and a Physical Hybrid Automatic Repeat Request (HARQ) Indicator Channel (PHICH), and
   when the timing offset is 9 or 10 symbols, the channel of the serving cell suffering the interference by the PBCH of the neighbor interference cell is identified as one of a PDSCH, a PDCCH, a PCFICH, and a PHICH.

5. The method of claim 1, wherein the canceling the interference comprises:
   regenerating a PBCH of the neighbor interference cell by using the information regarding the PBCH of the neighbor interference cell; and
   canceling the interference by canceling a signal based on the regenerated PBCH from a channel signal of the serving cell including the interference by the PBCH of the neighbor interference cell.

6. The method of claim 5, wherein the regenerating the PBCH of the neighbor interference cell comprises:
   encoding the PBCH of the neighbor interference cell based on the information regarding the PBCH of the neighbor interference cell.

7. The method of claim 6, wherein the regenerating the PBCH of the neighbor interference cell further comprises:
using the encoded PBCH and a channel estimation result to regenerate the PBCH of the neighbor interference cell.

8. A terminal for receiving a signal using an interference cancellation, the terminal comprising:
a reception unit configured to receive information regarding a Physical Broadcast Channel (PBCH) of a neighbor interference cell and information regarding downlink synchronization with the neighbor interference cell; and
an interference cancellation unit configured to identify a channel of a serving cell suffering an interference by the PBCH of the neighbor interference cell according to the information regarding the downlink synchronization with the neighbor interference cell, and cancel an interference to receive the identified channel by using the information regarding the PBCH of the neighbor interference cell,
wherein the information regarding the downlink synchronization with the neighbor interference cell includes information on a timing offset between the serving cell and the neighbor interference cell, and
wherein the information on the timing offset is expressed by a number of slots.

9. The terminal of claim 8, wherein the information on the timing offset is further expressed by a number of subframes.

10. The terminal of claim 8, wherein when the timing offset is 0, the channel of the serving cell suffering the interference by the PBCH of the neighbor interference cell is identified as a PBCH.

11. The terminal of claim 8, wherein
when the timing offset is a subframe unit or 1 to 6 symbols or 11 to 13 symbols, the channel of the serving cell suffering the interference by the PBCH of the neighbor interference cell is identified as a Physical Downlink Shared Channel (PDSCH),
when the timing offset is 7 or 8 symbols, the channel of the serving cell suffering the interference by the PBCH of the neighbor interference cell is identified as one of a Physical Downlink Control Channel (PDCCH), a Physical Control Format Indicator Channel (PCFICH), and a Physical Hybrid Automatic Repeat Request (HARQ) Indicator Channel (PHICH), and
when the timing offset is 9 or 10 symbols, the channel of the serving cell suffering the interference by the PBCH of the neighbor interference cell is identified as one of a PDSCH, a PDCCH, a PCFICH, and a PHICH.

12. The terminal of claim 8, wherein the interference cancellation unit cancels the interference by regenerating the PBCH of the neighbor interference cell by using the information regarding the PBCH of the neighbor interference cell, and canceling a signal based on the regenerated PBCH from a channel signal of the serving cell including the interference by the PBCH of the neighbor cell.

13. The terminal of claim 12, wherein the interference cancellation unit regenerates the PBCH of the neighbor interference cell by encoding the PBCH of the neighbor interference cell based on the information regarding the PBCH of the neighbor interference cell.

\* \* \* \* \*